(12) United States Patent
Piersol et al.

(10) Patent No.: US 12,406,661 B2
(45) Date of Patent: Sep. 2, 2025

(54) DIGITAL ASSISTANT CONTROL OF APPLICATIONS

(71) Applicant: Apple Inc., Cupertino, CA (US)

(72) Inventors: Kurt W. Piersol, San Jose, CA (US); Cedric Bray, Sunnyvale, CA (US); Keith S. Brisson, Sandy, UT (US); Helmut Garstenauer, Ternberg (AT); Timothy R. Oriol, San Jose, CA (US); Jessica J. Peck, Morgan Hill, CA (US); Lewis N. Perkins, Cambridge, MA (US); Luca Simonelli, Cambridge (GB); Nathan D. Taylor, Scotts Valley, CA (US)

(73) Assignee: Apple Inc., Cupertino, CA (US)

( * ) Notice: Subject to any disclaimer, the term of this patent is extended or adjusted under 35 U.S.C. 154(b) by 347 days.

(21) Appl. No.: 18/114,877

(22) Filed: Feb. 27, 2023

(65) Prior Publication Data

US 2023/0206912 A1    Jun. 29, 2023

Related U.S. Application Data

(63) Continuation of application No. PCT/US2021/048036, filed on Aug. 27, 2021.
(Continued)

(51) Int. Cl.
*G10L 15/22* (2006.01)
*G06F 3/16* (2006.01)
(Continued)

(52) U.S. Cl.
CPC .......... *G10L 15/1822* (2013.01); *G06F 3/167* (2013.01); *G10L 15/063* (2013.01); *G10L 15/22* (2013.01); *G10L 2015/223* (2013.01)

(58) Field of Classification Search
CPC ............... G10L 15/22; G10L 2015/223; G10L 15/1822; G10L 15/063; G10L 15/1815;
(Continued)

(56) References Cited

U.S. PATENT DOCUMENTS

| 7,024,363 B1 | 4/2006 | Comerford et al. |
| 8,239,206 B1 | 8/2012 | Lebeau et al. |

(Continued)

FOREIGN PATENT DOCUMENTS

| EP | 3346400 A1 | 7/2018 |
| WO | 2022/047214 A2 | 3/2022 |

OTHER PUBLICATIONS

International Preliminary Report on Patentability received for PCT Patent Application No. PCT/US2023/017908, mailed on Dec. 12, 2024, 16 pages.
(Continued)

*Primary Examiner* — Vijay B Chawan
(74) *Attorney, Agent, or Firm* — DLA Piper LLP (US)

(57) ABSTRACT

Systems and processes for operating a digital assistant are provided. An example method includes, at an electronic device with one or more processors and memory, while an application is open on the electronic device: receiving a spoken input including a command, determining whether the command matches at least a portion of a metadata associated with an action of the application, and in accordance with a determination that the command matches at least the portion of the metadata associated with the action of the application, associating the command with the action, storing the association of the command with the action for subsequent use with the application by the digital assistant, and executing the action with the application.

45 Claims, 16 Drawing Sheets

Related U.S. Application Data

(60) Provisional application No. 63/113,032, filed on Nov. 12, 2020, provisional application No. 63/071,087, filed on Aug. 27, 2020.

(51) Int. Cl.
   *G10L 15/06* (2013.01)
   *G10L 15/18* (2013.01)

(58) Field of Classification Search
   CPC . G10L 2015/228; G10L 15/30; G10L 15/187; G10L 15/183; G10L 15/18; G10L 15/06; G06F 40/35; G06F 40/295; G06F 40/274; G06F 40/20
   USPC ............................................... 704/232
   See application file for complete search history.

(56) References Cited

U.S. PATENT DOCUMENTS

| | | | |
|---|---|---|---|
| 9,940,396 B1 * | 4/2018 | Willhoit | G06F 16/9535 |
| 10,089,983 B1 | 10/2018 | Gella et al. | |
| 10,102,855 B1 | 10/2018 | Sindhwani | |
| 10,504,512 B1 * | 12/2019 | Sarikaya | G06F 40/295 |
| 10,671,343 B1 | 6/2020 | Kim et al. | |
| 2007/0265832 A1 | 11/2007 | Bauman et al. | |
| 2014/0164533 A1 * | 6/2014 | Lynch | H04L 51/046 |
| | | | 709/206 |
| 2015/0106096 A1 | 4/2015 | Toopran et al. | |
| 2015/0161108 A1 | 6/2015 | Back | |
| 2016/0066360 A1 | 3/2016 | Vinegrad et al. | |
| 2016/0313958 A1 | 10/2016 | Guadarrama et al. | |
| 2016/0342803 A1 | 11/2016 | Goodridge et al. | |
| 2016/0358603 A1 | 12/2016 | Azam et al. | |
| 2017/0358303 A1 * | 12/2017 | Walker, II | G10L 15/1815 |
| 2017/0365251 A1 | 12/2017 | Park et al. | |
| 2018/0260680 A1 * | 9/2018 | Finkelstein | G06N 5/04 |
| 2018/0315427 A1 * | 11/2018 | Kwon | G10L 15/1815 |
| 2018/0336893 A1 | 11/2018 | Robinson et al. | |
| 2019/0172465 A1 | 6/2019 | Lee et al. | |
| 2020/0042334 A1 * | 2/2020 | Radebaugh | G10L 15/26 |
| 2020/0251111 A1 | 8/2020 | Temkin et al. | |
| 2020/0356610 A1 | 11/2020 | Coimbra et al. | |
| 2020/0357387 A1 | 11/2020 | Prabhavalkar et al. | |
| 2020/0411002 A1 | 12/2020 | Lee et al. | |
| 2021/0210089 A1 | 7/2021 | Ma et al. | |
| 2022/0050661 A1 | 2/2022 | Lange et al. | |
| 2022/0084511 A1 * | 3/2022 | Nickson | G10L 15/063 |
| 2022/0093098 A1 | 3/2022 | Samal et al. | |
| 2022/0229991 A1 * | 7/2022 | Duong | G06F 40/289 |
| 2023/0368791 A1 * | 11/2023 | Walker, II | G10L 15/1815 |
| 2023/0395067 A1 | 12/2023 | Perkins et al. | |
| 2024/0265914 A1 | 8/2024 | Perkins et al. | |

OTHER PUBLICATIONS

Office Action received for European Patent Application No. 21777901.6, mailed on Feb. 24, 2025, 9 pages.
Corrected Notice of Allowance received for U.S. Appl. No. 17/946,977, mailed on Apr. 3, 2024, 2 pages.
Notice of Allowance received for U.S. Appl. No. 17/946,977, mailed on Jan. 31, 2024, 16 pages.
Advisory Action received for U.S. Appl. No. 17/946,977, mailed on Dec. 13, 2023, 3 pages.
Advisory Action received for U.S. Appl. No. 17/946,977, mailed on Mar. 20, 2023, 5 pages.
Applicant-Initiated Interview Summary received for U.S. Appl. No. 17/946,977, mailed on Jan. 30, 2023, 3 pages.
Applicant-Initiated Interview Summary received for U.S. Appl. No. 17/946,977, mailed on Mar. 15, 2023, 3 pages.
Applicant-Initiated Interview Summary received for U.S. Appl. No. 17/946,977, mailed on Nov. 22, 2023, 3 pages.
Examiner Initiated Interview Summary received for U.S. Appl. No. 17/946,977, mailed on Sep. 22, 2023, 2 pages.
Extended European Search Report received for European Patent Application No. 23169461.3, mailed on Oct. 4, 2023, 11 pages.
Final Office Action received for U.S. Appl. No. 17/946,977, mailed on Feb. 8, 2023, 29 pages.
Final Office Action received for U.S. Appl. No. 17/946,977, mailed on Oct. 31, 2023, 35 pages.
Google Codelabs, "Extend Dynamic Shortcuts to Google Assistant with App Actions (Beta)", Available on: https://web.archive.org/web/20220524223852/https://codelabs.developers.google.com/codelabs/appactions-dynamic-shortcuts, May 24, 2022, 25 pages.
International Search Report and Written Opinion received for PCT Patent Application No. PCT/US2023/017908, mailed on Jul. 19, 2023, 22 pages.
Non-Final Office Action received for U.S. Appl. No. 17/946,977, mailed on Jan. 23, 2023, 25 pages.
Non-Final Office Action received for U.S. Appl. No. 17/946,977, mailed on Jul. 25, 2023, 29 pages.
Non-Final Office Action received for U.S. Appl. No. 17/946,977, mailed on Nov. 28, 2022, 25 pages.
International Preliminary Report on Patentability received for PCT Patent Application No. PCT/US2021/048036, mailed on Mar. 9, 2023, 24 pages.
International Search Report and Written Opinion received for PCT Patent Application No. PCT/US2021/048036, mailed on Mar. 25, 2022, 30 pages.
Invitation to Pay Additional Fees received for PCT Patent Application No. PCT/US2021/048036, mailed on Dec. 8, 2021, 12 pages.
Intention to Grant received for European Patent Application No. 23169461.3, mailed on Apr. 4, 2025, 9 pages.

* cited by examiner

DIGITAL ASSISTANT CONTROL OF APPLICATIONS

RELATED APPLICATION

This application is a continuation of PCT Application PCT/US2021/048036 filed Aug. 27, 2021, entitled "DIGITAL ASSISTANT CONTROL OF APPLICATIONS," which claims the benefit of U.S. Provisional Patent Application Ser. No. 63/071,087 filed Aug. 27, 2020, entitled "DIGITAL ASSISTANT CONTROL OF APPLICATIONS," and U.S. Provisional Application No. 63/113,032, entitled "DIGITAL ASSISTANT CONTROL OF APPLICATIONS," filed Nov. 12, 2020, the contents of which are incorporated by reference herein in their entirety for all purposes.

FIELD

This relates generally to digital assistants and, more specifically, to enabling digital assistant to understand new commands.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

In some cases, the digital assistant may interact with new applications or receive new commands. Accordingly, the digital assistant may require training to be able to interact with the applications or process the commands to perform one or more tasks as discussed above. This can be cumbersome and time intensive, creating barriers for developers who wish to integrate their applications with the digital assistant and for users who seek a greater level of access to different tasks with the digital assistant.

SUMMARY

Example methods are disclosed herein. An example method includes, at an electronic device with one or more processors and memory, while an application is open on the electronic device: receiving a spoken input including a command, determining whether the command matches at least a portion of a metadata associated with an action of the application, and in accordance with a determination that the command matches at least the portion of the metadata associated with the action of the application, associating the command with the action, storing the association of the command with the action for subsequent use with the application by the digital assistant, and executing the action with the application.

Example non-transitory computer-readable media are disclosed herein. An example non-transitory computer-readable storage medium stores one or more programs. The one or more programs comprise instructions, which when executed by one or more processors of an electronic device, cause the electronic device to while an application is open on the electronic device: receive a spoken input including a command, determine whether the command matches at least a portion of a metadata associated with an action of the application, and in accordance with a determination that the command matches at least the portion of the metadata associated with the action of the application, associate the command with the action, store the association of the command with the action for subsequent use with the application by the digital assistant, and execute the command with the application.

Example electronic devices are disclosed herein. An example electronic device comprises one or more processors; a memory; and one or more programs, where the one or more programs are stored in the memory and configured to be executed by the one or more processors, the one or more programs including instructions for while an application is open on the electronic device: receiving a spoken input including a command, determining whether the command matches at least a portion of a metadata associated with an action of the application, and in accordance with a determination that the command matches at least the portion of the metadata associated with the action of the application, associating the command with the action, storing the association of the command with the action for subsequent use with the application by the digital assistant, and executing the action with the application.

An example electronic device comprises while an application is open on the electronic device: means for receiving a spoken input including a command, means for determining whether the command matches at least a portion of a metadata associated with an action of the application, and in accordance with a determination that the command matches at least the portion of the metadata associated with the action of the application, means for associating the command with the action, means for storing the association of the command with the action for subsequent use with the application by the digital assistant, and means for executing the action with the application.

Determining whether the command matches at least a portion of a metadata associated with an action of the application allows the digital assistant to quickly learn new commands and interface with new applications without a lengthy and labor intensive registration process. In this way developers may interface with the digital assistant more efficiently. Additionally develops may publish their applications more quickly without needing to determine how the application may need to be modified or what of the application needs to be available to teach the digital assistant to interact with the application. Further, this allows users more efficient use of the digital assistant and applications as the digital assistant may learn how to interact with the application over time, resulting in less errors presented to the user. Thus, the efficiency of the electronic device is increased and the power requirements reduced so that overall battery efficiency is also increased (e.g., because the user does not need to provide requests as frequently or check for updates to applications as often).

Further, associating the command with the action and storing the association of the command with the action for subsequent use with the application by the digital assistant allows for more efficient performance of the action. In particular, the digital assistant may access the stored association when processing spoken input to determine whether the user is invoking the command and perform the associated action with performing the prior determination based on metadata. In this way the digital assistant and the electronic device may more efficiently respond to subsequent user requests increasing the efficiency of the electronic device so that overall battery efficiency is also increased (e.g., by reducing the processing necessary to perform the action).

An example method includes, at an electronic device with one or more processors and memory, receiving an utterance from a user, determining a first natural language recognition score for the utterance with a first lightweight natural language model associated with a first application, determining a second natural language recognition score for the utterance with a second lightweight natural language model associated with a second application, determining whether the first natural language recognition score exceeds a predetermined threshold, and in accordance with a determination that the first natural language recognition score exceeds the predetermined threshold, providing the utterances to a complex natural language model associated with the first application and determining, with the complex natural language model, a user intent corresponding to the utterance.

An example non-transitory computer-readable storage medium stores one or more programs. The one or more programs comprise instructions, which when executed by one or more processors of an electronic device, cause the electronic device to: receive an utterance from a user, determine a first natural language recognition score for the utterance with a first lightweight natural language model associated with a first application, determine a second natural language recognition score for the utterance with a second lightweight natural language model associated with a second application, determine whether the first natural language recognition score exceeds a predetermined threshold, and in accordance with a determination that the first natural language recognition score exceeds the predetermined threshold, provide the utterances to a complex natural language model associated with the first application and determine, with the complex natural language model, a user intent corresponding to the utterance.

An example electronic device comprises one or more processors; a memory; and one or more programs, where the one or more programs are stored in the memory and configured to be executed by the one or more processors, the one or more programs including instructions for receiving an utterance from a user, determining a first natural language recognition score for the utterance with a first lightweight natural language model associated with a first application, determining a second natural language recognition score for the utterance with a second lightweight natural language model associated with a second application, determining whether the first natural language recognition score exceeds a predetermined threshold, and in accordance with a determination that the first natural language recognition score exceeds the predetermined threshold, providing the utterances to a complex natural language model associated with the first application and determining, with the complex natural language model, a user intent corresponding to the utterance.

An example electronic device comprises: means for receiving an utterance from a user, means for determining a first natural language recognition score for the utterance with a first lightweight natural language model associated with a first application, means for determining a second natural language recognition score for the utterance with a second lightweight natural language model associated with a second application, means for determining whether the first natural language recognition score exceeds a predetermined threshold, and in accordance with a determination that the first natural language recognition score exceeds the predetermined threshold, means for providing the utterances to a complex natural language model associated with the first application and means for determining, with the complex natural language model, a user intent corresponding to the utterance.

Determining a first natural language recognition score for the utterance with a first lightweight natural language model associated with a first application and determining whether the first natural language recognition score exceeds a predetermined threshold allows the digital assistant to determine whether further processing of the utterance is needed for a specific application while reducing processing power and conserving battery. In particular, the lightweight natural language model is less complex than other natural language recognition models and thus can determine the natural language score using less resources than would otherwise be required to determine a user intent. Accordingly, applications which are determined to be irrelevant to the utterance may be disregarded and no further processing by those applications need be performed. This further improves the user experience by increasing the accuracy and response speed of the digital assistant.

An example method includes, at an electronic device with one or more processors and memory, receiving an utterance from a user, determining one or more representations of the utterance using a speech recognition model at least partially trained with data representing an application, providing the one or more representations of the utterance to a plurality of natural language models, wherein at least one natural language model of the plurality of natural language models is associated with the application and registered when data representing the application is received from a second electronic device, and determining a user intent of the utterance based on the at least one of the plurality of natural language models and a database including a plurality of actions and objects associated with the application.

An example non-transitory computer-readable storage medium stores one or more programs. The one or more programs comprise instructions, which when executed by one or more processors of an electronic device, cause the electronic device to: receive an utterance from a user, determine one or more representations of the utterance using a speech recognition model at least partially trained with data representing an application, provide the one or more representations of the utterance to a plurality of natural language models, wherein at least one natural language model of the plurality of natural language models is associated with the application and registered when data representing the application is received from a second electronic device, and determine a user intent of the utterance based on the at least one of the plurality of natural language models and a database including a plurality of actions and objects associated with the application.

An example electronic device comprises one or more processors; a memory; and one or more programs, where the one or more programs are stored in the memory and configured to be executed by the one or more processors, the one or more programs including instructions for receiving an utterance from a user, determining one or more representations of the utterance using a speech recognition model at least partially trained with data representing an application, providing the one or more representations of the utterance to a plurality of natural language models, wherein at least one natural language model of the plurality of natural language models is associated with the application and registered when data representing the application is received from a second electronic device, and determining a user intent of the utterance based on the at least one of the plurality of natural language models and a database including a plurality of actions and objects associated with the application.

An example electronic device comprises: means for receiving an utterance from a user, means for determining one or more representations of the utterance using a speech recognition model at least partially trained with data representing an application, means for providing the one or more representations of the utterance to a plurality of natural language models, wherein at least one natural language model of the plurality of natural language models is associated with the application and registered when data representing the application is received from a second electronic device, and means for determining a user intent of the utterance based on the at least one of the plurality of natural language models and a database including a plurality of actions and objects associated with the application.

Determining a user intent of the utterance based on the at least one of the plurality of natural language models and a database including a plurality of actions and objects associated with the application allows for the digital assistant to determine different user intents based on the applications that have been installed and integrated with the digital assistant. Accordingly, new applications may be integrated over time increasing the capabilities of the digital assistant. This in turn increase user enjoyment of the digital assistant and the electronic device while also increasing the efficiency of the electronic device conserving power.

An example method includes, at an electronic device with one or more processors and memory, receiving a user utterance including a request, determining whether the request includes an ambiguous term, in accordance with a determination that the request includes the ambiguous term providing the user utterance to a reference resolution model, determining, with the reference resolution model, a plurality of relevant reference factors, determining a relevant application based on the relevant reference factors, and determining an object that the request references based on the relevant application.

An example non-transitory computer-readable storage medium stores one or more programs. The one or more programs comprise instructions, which when executed by one or more processors of an electronic device, cause the electronic device to: receive a user utterance including a request, determine whether the request includes an ambiguous term, in accordance with a determination that the request includes the ambiguous term providing the user utterance to a reference resolution model, determine, with the reference resolution model, a plurality of relevant reference factors, determine a relevant application based on the relevant reference factors, and determine an object that the request references based on the relevant application.

An example electronic device comprises one or more processors; a memory; and one or more programs, where the one or more programs are stored in the memory and configured to be executed by the one or more processors, the one or more programs including instructions for receiving a user utterance including a request, determining whether the request includes an ambiguous term, in accordance with a determination that the request includes the ambiguous term providing the user utterance to a reference resolution model, determining, with the reference resolution model, a plurality of relevant reference factors, determining a relevant application based on the relevant reference factors, and determining an object that the request references based on the relevant application.

An example electronic device comprises: means for receiving a user utterance including a request, means for determining whether the request includes an ambiguous term, in accordance with a determination that the request includes the ambiguous term means for providing the user utterance to a reference resolution model, means for determining, with the reference resolution model, a plurality of relevant reference factors, means for determining a relevant application based on the relevant reference factors, and means for determining an object that the request references based on the relevant application Determining an object that the request references based on the relevant application allows for the digital assistant to execute tasks associated with user inputs even when the user inputs are not clear. This increases user satisfaction with the device as less time is required with back and forth exchanges between the user and the digital assistant and instead the task the user requested is executed. Further, this increases efficiency of the electronic device as battery is conserved by determining the object without asking the user for more information and providing the associated outputs with that disambiguation process.

DESCRIPTION

Figure 1A:
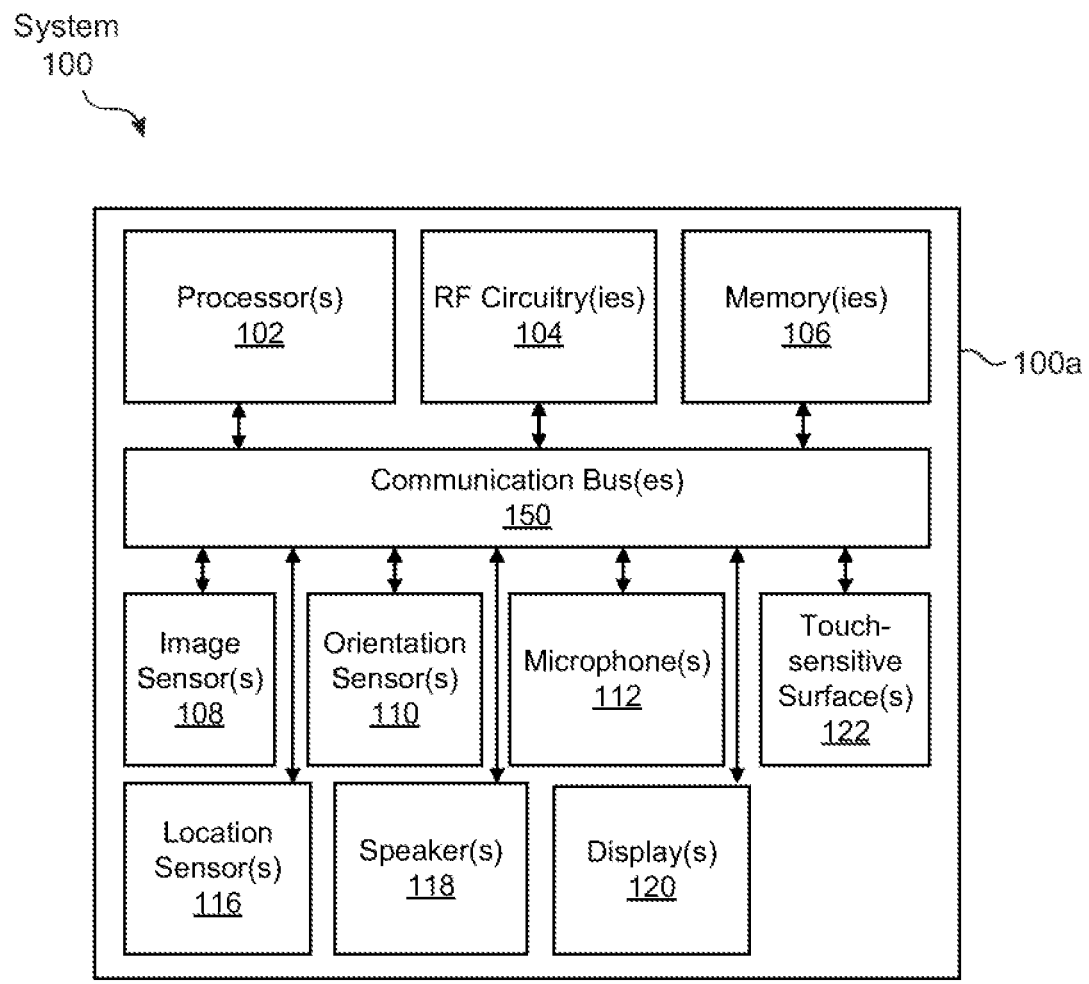
FIGS. 1A-1B depict exemplary systems for use in various computer-generated reality technologies, including virtual reality and mixed reality.

Various examples of electronic systems and techniques for using such systems in relation to various computer-generated reality technologies are described.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, an MR environment is anywhere between, but not including, a wholly physical environment at one end and a VR environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of MR include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An AR environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one example, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
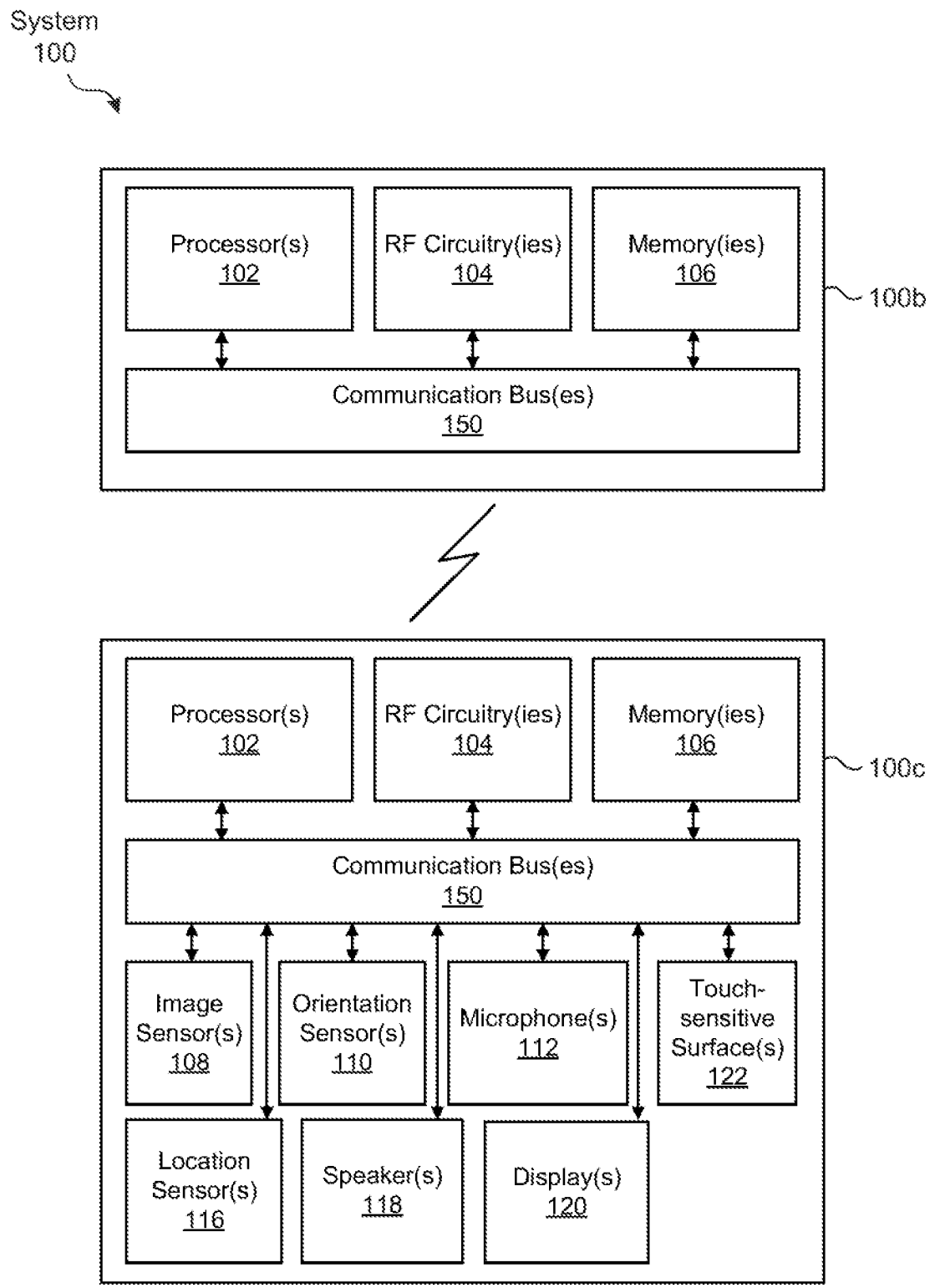

FIG. 1A and FIG. 1B depict exemplary system 100 for use in various computer-generated reality technologies.

In some examples, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some examples, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some examples, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some examples, system 100 is a mobile device. In some examples, system 100 is a head-mounted display (HMD) device. In some examples, system 100 is a wearable HUD device.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some examples, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

Figure 2:
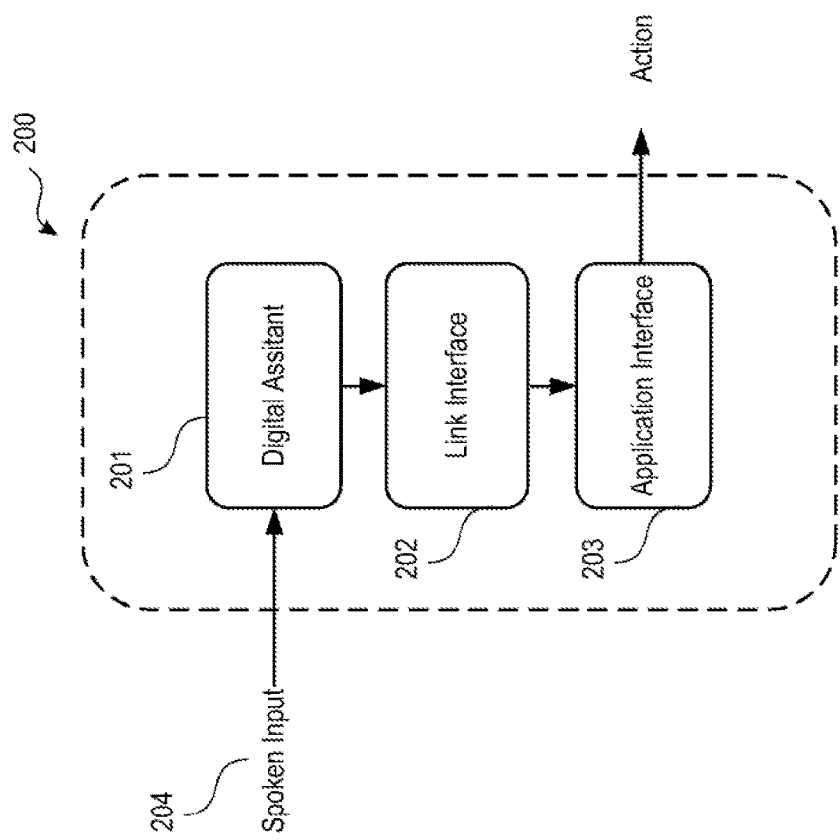
FIG. 2 depicts an exemplary system for mapping and executing user commands.

FIG. 2 depicts exemplary system 200 for mapping and executing user commands. In some examples, as illustrated in FIG. 2, system 200 includes digital assistant 201, link interface 202, and application interface 203. In some examples, system 200 is implemented on electronic device 100. In some examples, system 200 is implemented across other devices (e.g., a server) in addition to electronic device 100. In some examples, some of the modules and functions of system 200 are divided into a server portion and a client portion, where the client portion resides on one or more user devices (e.g., electronic device 100) and communicates with the server portion through one or more networks.

In some examples, digital assistant 201 is a digital assistant system. In some examples, the digital assistant system is implemented on a standalone computer system. In some examples, the digital assistant system is distributed across multiple electronic devices. In some examples, some of the modules and functions of the digital assistant are divided into a server portion and a client portion, where the client portion resides on one or more user devices (e.g., devices 100,) and communicates with the server portion through one or more networks. The various components of the digital assistant system are implemented in hardware, software instructions for execution by one or more processors, firmware, including one or more signal processing and/or application specific integrated circuits, or a combination thereof.

It should be noted that system 200 is only one example and that system 200 can have more or fewer components than shown, can combine two or more components, or can have a different configuration or arrangement of the components. The various components shown in FIG. 2 are implemented in hardware, software instructions for execution by one or more processors, firmware, including one or more signal processing and/or application specific integrated circuits, or a combination thereof.

System 200 receives spoken input 204 including a command and provides spoken input 204 to digital assistant 201. After receiving spoken input 204, digital assistant 201 performs a semantic analysis on spoken input 204. In some examples, performing the semantic analysis includes performing automatic speech recognition (ASR) on spoken input 204. In particular, digital assistant 201 can include one or more ASR systems that process spoken input 204 received through input devices (e.g., a microphone) of electronic device 100. The ASR systems extract representative features from the speech input. For example, the ASR systems pre-processor performs a Fourier transform on the spoken input 204 to extract spectral features that characterize the speech input as a sequence of representative multi-dimensional vectors.

Further, each ASR system of digital assistant 201 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens).

In some examples, performing semantic analysis includes performing natural language processing on spoken input 204. In particular, once digital assistant 201 produces recognition results containing a text string (e.g., words, or sequence of words, or sequence of tokens) through ASR, input analyzer may deduce an intent of spoken input 204. In some examples, digital assistant 201 produces multiple candidate text representations of the speech input. Each candidate text representation is a sequence of words or tokens corresponding to spoken input 204. In some examples, each candidate text representation is associated with a speech recognition confidence score. Based on the speech recognition confidence scores, digital assistant 201 ranks the candidate text representations and may provide the n-best (e.g., n highest ranked) candidate text representation(s) to other modules of system 200 for further processing.

In some examples, based on the semantic analysis of spoken input 204, digital assistant 201 determines an action or task corresponding to the command of spoken input 204 and performs the action or task. For example, system 200 may receive the spoken input "What's the weather like?" as spoken input 204. Accordingly, digital assistant 201 may perform semantic analysis on spoken input 204 and determine the task of providing the current weather based on the input. In particular, digital assistant 201 may have been previously trained to recognize that the term "weather" is related to determining the current weather and perform that task. Further, digital assistant 201 may recognize one or more applications associated with the action of determining the current weather and call one or more of those applications to perform the task. Digital assistant 201 may then provide an output indicating the current weather after executing the task.

Figure 4:
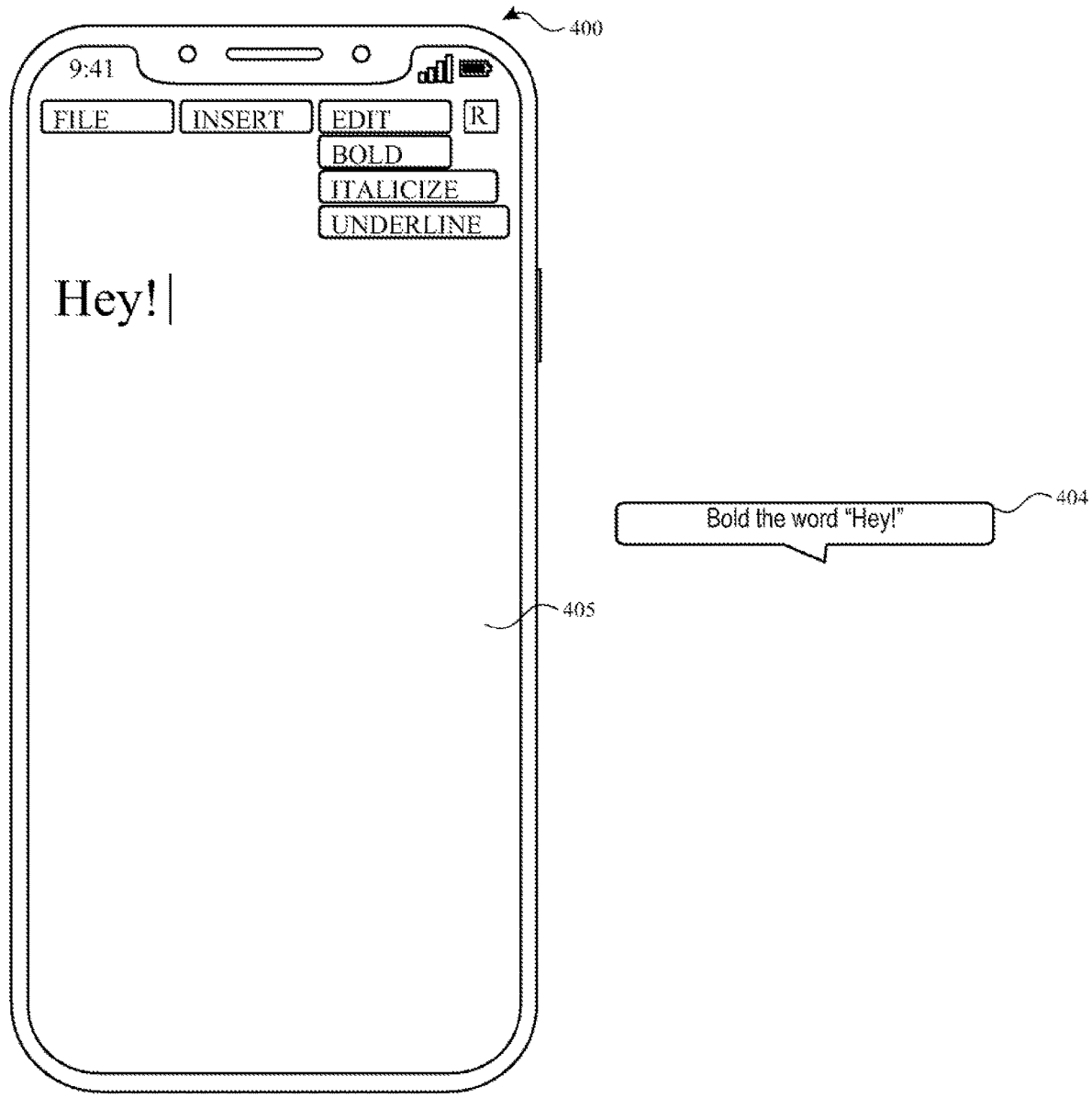
FIG. 4 depicts an example input command to be mapped and executed.

However, in some examples, digital assistant 201 may not recognize the command of spoken input 204. In particular, the command of spoken input 204 can be a new command related to an application that digital assistant 201 does not recognize, a command used in a context that digital assistant 201 does not recognize, or any other command that digital assistant 201 has not been trained to recognize or interacted with previously. For example, as shown in FIG. 4, system 200 may receive the spoken input 404 "bold the word 'Hey!'." Digital assistant 201 may process the spoken input to determine that the command is "bold" but may not understand what the command "bold" means or what action to perform based on that command. Accordingly, system 200 and digital assistant 201 may determine the action to perform for the command "bold" by accessing link interface 202, as described below.

Figure 3:
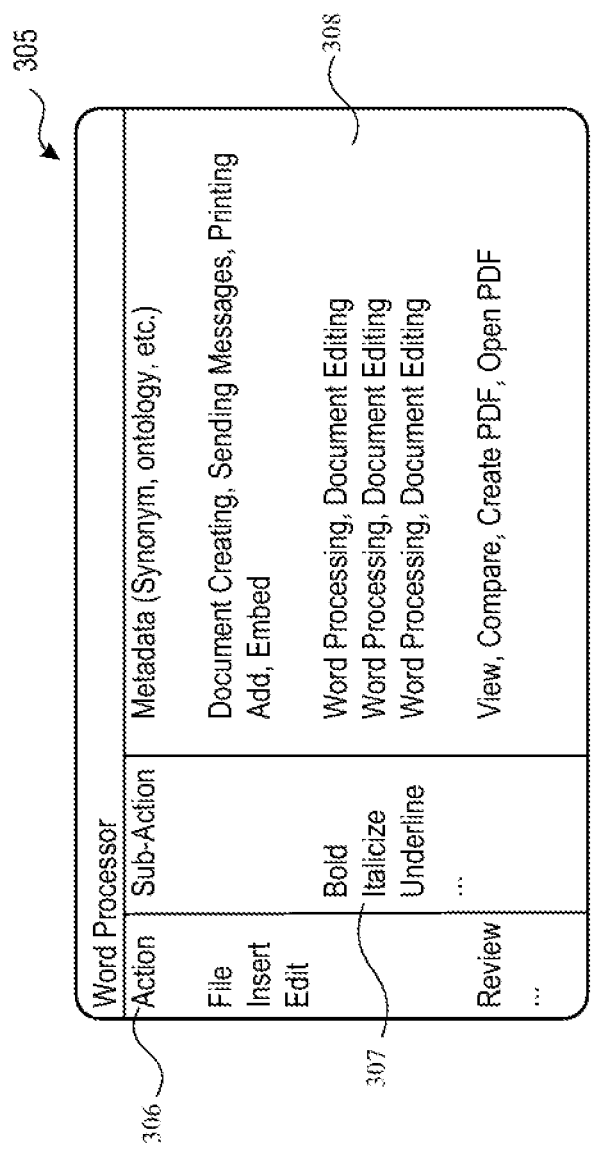
FIG. 3 depicts an exemplary link interface of the system for mapping user commands to actions.

FIG. 3 illustrates an exemplary link interface 202, according to various examples. Link interface 202 includes a link model 305 for each application installed on electronic device 100. In some examples, link interface 202 includes a link model 305 for each application available to digital assistant 201, including those that are not installed on electronic device 100. For example, link interface 202 may include link models for applications installed on servers or other networked electronic devices that digital assistant 201 may interact with.

While this application relates to how digital assistants like digital assistant 201 can interact with link interface 202 to satisfy commands provided by a user, it should be appreciated that other interfaces that the user may interact with can interact and utilize link interface 202 and the information it includes in a similar manner. For example, a graphical user interface of a device may interact with link interface 202 to determine how to display the actions and sub-actions discussed below to facilitate the interaction with the user without requiring the developer of the application to map each portion of link interface 202 to specific elements and sub-elements of a user interface. Rather, this process may be automated by using the information in link interface 202 to automatically generate a user interface connecting the user to the application.

Link model 305 includes a plurality of actions 306 that its associated application is capable of performing. In some examples, plurality of actions 306 further includes one or more sub-actions 307 for each of actions 306. In some examples, link model 305 includes a plurality of hierarchal links between related actions 306 and sub-actions 307 of the plurality of actions. For example, as shown in FIG. 3, the sub-actions "bold," "italicize," and "underline" are nested under the action of "edit." Thus, these three sub-actions are hierarchically below the action of edit and are linked to the action of edit. In this way link models 305 of link interface 202 present the various actions associated with the application in a tree link model that may be efficiently searched.

In some examples, actions 306 and sub-actions 307 of link model 305 represent different link classes of link model 305. In some examples, actions 306 and sub-actions 307 represent link classes associated with a container class. For example, the "insert" action may be associated with a container class link because many different types of objects may be inserted into a document. In some examples, actions 306 and sub-actions 307 represent link classes associated with an individual class. For example, the "delete" action may be associated with an individual class link because typically individual items are being deleted from a document.

Actions 306 and sub-actions 307 include active and inactive actions of the associated application. Active actions of the associated application are actions that are currently displayed by the application. For example, as shown in FIG. 4, the actions of "insert," "bold," "italicize," and "underline" are being displayed and therefore are active actions. Inactive actions of the associated applications are actions that are not currently displayed by the application. For example, returning to FIG. 4, there could be many other actions that are currently not being displayed, including sub-actions of "insert" or the action "review" as shown in FIG. 3. Thus, these actions that are not being displayed are inactive actions. In some examples, as discussed further below, digital assistant 201 may interact with link interface 202 to search actions that are active, actions that are inactive, or both, depending on the command received, what is being displayed by an electronic device, and which applications are currently available.

Each of actions 306 and sub-actions 307 is associated with one or more pieces of metadata 308, as shown in FIG. 3. In some examples, metadata 308 includes synonyms of the associated sub-action or action. For example, as shown in FIG. 3, the metadata for the action "insert" can include the synonyms "add" and "embed." By associating these terms as metadata for the "insert" action the digital assistant does not need to learn specific language that the word processing application associated with link model 305 requires. Rather, as discussed further below, when a user provides a command that digital assistant 201 does not recognize, digital assistant 201 may search actions 306 and metadata 308 to determine an action of the word processing application that corresponds to the command.

In some examples, metadata 308 includes an ontology corresponding to the associated action or sub-action. For example, as shown in FIG. 3, the metadata for the sub-actions "bold," "italicize," and "underline," include the ontology of "word processing," and "document editing." As another example, the metadata for the action "file" may include more and different ontologies because of the different functions typically included under the "file" action of a word processing application such as "document creation," "sending messages," and "printing." In some examples, metadata 308 includes related actions or sub-actions. In some examples, the related actions or sub-actions may be actions or sub-actions that are located in a different portions of link model 305 or in a different link model. For example, the metadata for the "review" action may include the actions "view" and "compare" of the word processing application which can be used to help "review" the document. Additionally, the metadata for the "review" action may also include the actions "create PDF" and "open PDF" of a PDF creation application which could also be used to review and/or edit the current document.

In this way, as discussed above with regard to the use of synonyms in metadata 308, link model 305, and by extension link interface 202, may include a much broader selection of ideas and terms for digital assistant 201 to search when attempting to match a command of a user input. This results in more successful matches without requiring digital assistant 201 or the user to learn and provide specific language. Rather, new applications and new actions may simply be added to the capabilities of digital assistant 201 with minimal additional work by developers and less frustration by the user.

In some examples, link model 305 of link interface 202 is provided by the associated application. For example, when the application is installed on the electronic device or is otherwise made available to link interface 202, the application may provide link model 305 including actions 306, sub-actions 307, and metadata 308 to be added to link interface 202. Accordingly, link model 305 may be quickly incorporated into link interface 202 and made available for accessing by digital assistant 201. In some examples, each application that connects to link interface 202 provides an associated link model including actions, sub-actions, and metadata. Accordingly, many different applications and their associated link models may be quickly integrated into link interface 202 and thus system 200.

In some examples, link models 305 of link interface 202 are updated over time. In some examples, new link models 305 are added to link interface 202 such as when new applications are made available to digital assistant 201. For example, a new application may be installed on the electronic device and thus become accessible to digital assistant 201 and a link model associated with the application is added to link interface 202. In some examples, actions 306 are added to link models 305 when applications are updated or the capabilities of the applications are changed. In some examples, metadata 308 of link models 305 is updated when new synonyms are determined or ontology related to the actions 306 is changed.

In some examples, link models 305 of link interface 202 are created based on source code provided by a developer of an application associated with the link models. In some examples, the source code provided by the developer is combined with source code of the user interface or digital assistant in order to create link models 305 of link interface 202. In some examples, link models 305 of link interface 202 are created based on source code associated with the user interface or digital assistant. Thus, link models 305 of link interface 202 can be created using source code provided separately for one or more applications and the digital assistant and can also be created using source code that has been combined to include the source code of the applications and the digital assistant.

In some examples, link models 305 of link interface 202 and actions of link models 305 are created from data files. In some examples, the data files may be downloaded from a developer along with an application update. In some examples, the data files may be provided when an application is installed. For example, a developer may provide an application update and additionally a data file including new or updated actions annotated with the appropriate metadata. This data file may automatically converted into the appropriate link model for the application and stored with link interface 202.

In some examples, link models 305 of link interface 202 are created based on a provided GUI of an application. For example, a developer of an application may provide a GUI that they have created for an application that is to be integrated with link interface 202 and digital assistant 201. Accordingly, digital assistant 201 and/or other components of the system may convert the various components of the GUI (e.g., selectable buttons, pages, etc.) into corresponding action, sub-action, and metadata to be stored as a link mode of link interface 202. Thus, link models 305 of link interface 202 can be created from various different portions of an application in order to create more complete link models with less work on the part of developers.

In some examples, as shown in FIG. 4, spoken input 404 is received while application 405 for word processing is open (e.g., running) on electronic device 400. After receiving spoken input 404, digital assistant 201 may perform a semantic analysis on spoken input 404 to determine whether the command of spoken input 404 (e.g., "bold") is recognized by digital assistant 201. When the command of spoken input 404 is recognized by digital assistant 201, digital assistant 201 determines a task or action corresponding to the command and executes the task or action or prompts application 405 to execute the task or action.

However, when digital assistant 201 does not recognize the command of spoken input 404, as shown in FIG. 4, digital assistant 201 accesses link interface 202 to determine an action that corresponds to the unrecognized command. In some examples, accessing link interface 202 includes accessing a link model that corresponds to the application 405 that is currently open on electronic device 400. For example, when spoken input 404 of "bold the word 'Hey!'" is received by digital assistant 201, digital assistant 201 may access a link model of link interface 202 that is associated with application 405 because application 405 is open.

In some examples, application 405 is open and is the focus of electronic device 400, as shown in FIG. 4. In some examples, application 405 is open but another application or a general user interface is the focus of electronic device 400. When this occurs, digital assistant 201 may still access the link model 305 of link interface 202 associated with application 405, as discussed further below. For example, digital assistant 201 may receive an input returning to a home screen of a user interface of electronic device 400 after text has been entered. Subsequently, digital assistant 201 may receive spoken input 404 "bold the word 'Hey!'" Accordingly, digital assistant 201 may search link model 305 associated with application 405 even though application 405 is no longer the focus of electronic device 400. Rather, digital assistant 201 searches link model 305 associated with application 405 because application 405 continues to be open (e.g., running) on electronic device 400.

In some examples, digital assistant 201 may prioritize searching link models associated with applications that are the focus of the electronic device, as discussed further below. Further, in some examples, digital assistant 201 may search all link models available in link interface 202, regardless of which applications are open on electronic device 400 and which applications are the focus of electronic device 400. In some examples, a process associated with link interface 202 determines the installed applications and the running applications and facilitates connection between digital assistant 201 and the various applications. Accordingly, link interface 202 may send a request to the appropriate application including starting or launching an application after a determination by digital assistant 201 that the particular applications is required.

In some examples, determining an action that corresponds to the command includes searching the actions and the sub-actions of the accessed link model of link interface 202. For example, as shown in FIG. 3, the link model 305 corresponding to the word processing application 405 may include various actions 306 such as "file," "insert," and "edit," and sub-actions 307 such as "bold," "italicize," and "underline." Accordingly, digital assistant 201 may search actions 306 and sub-actions 307 to determine if any of them match the command included in spoken input 404. Thus, digital assistant 201 may search actions 306 and sub-actions 307 for the command "bold" and determine that one of the sub-actions matches the command "bold" of spoken input 404.

In some examples, determining an action that corresponds to the command includes searching the actions and the sub-actions of the link models of link interface 202, including link models belonging to applications that are not currently active or open on electronic device 400. For example, when spoken input 404 of "bold this" is received by digital assistant 201, digital assistant 201 may search the link models of link interface 202 including those belonging to unopened or inactive applications for calling a car, making a reservation, etc. In some examples, digital assistant 201 may search link models of link interface 202 belonging to applications that are not currently active or open after first searching the link models belonging to applications that are currently open (e.g., application 405).

Figure 5:
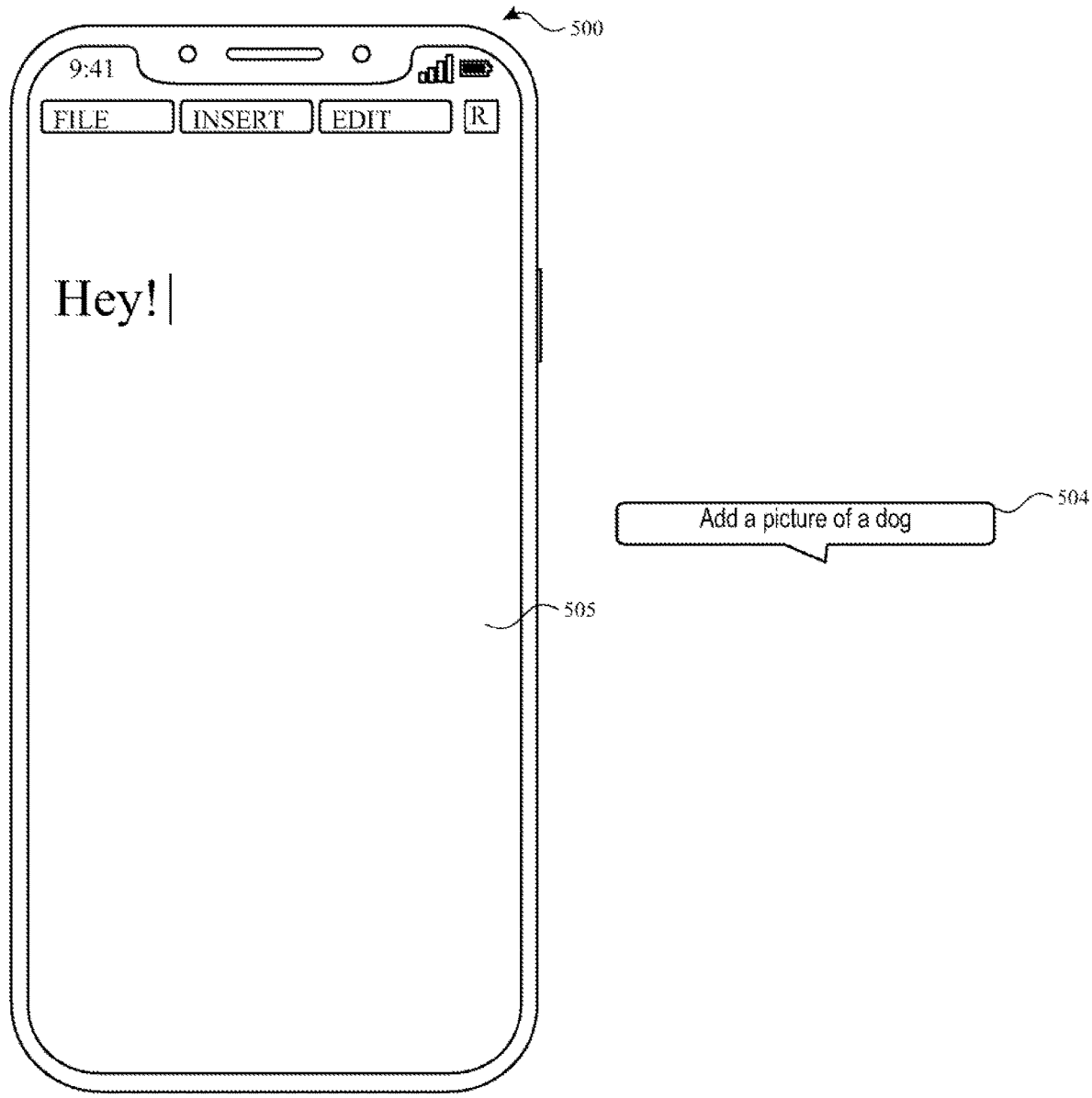
FIG. 5 depicts an example input command to be mapped and executed.

In some examples, determining an action that corresponds to the command includes determining whether the command matches at least a portion of a metadata associated with an action (e.g., sub-action) of link interface 202. For example, as shown in FIG. 5, spoken input 504 of "add a picture of a dog" includes the command "add." Accordingly, digital assistant 201 may search link models of link interface 202 for metadata that includes the word "add." Digital assistant 201 may then identify that the action "insert" associated with the metadata "add" is capable of executing the command included in spoken input 504.

In some examples, digital assistant 201 may search metadata associated with the actions for the command after searching the actions and sub-actions for the command. For example, as discussed above, digital assistant 201 may search link models of link interface 202 for an action of "add," including a link model corresponding to application 505 that is currently open on electronic device 500. After finding no action that matches the command "add" digital assistant 201 may then search the metadata as discussed above.

In some examples, digital assistant 201 may search metadata associated with the actions for the command concurrently while searching the actions and/or sub-actions. Accordingly, the digital assistant 201 may tailor the searching of link interface 202 based on the resources available including processing power and time. For example, if speed of the determination is more important and processing power is not a concern digital assistant 201 may search the actions and the metadata associated with the actions concurrently. Conversely, if speed of the determination is not important and/or processing power needs to be conserved or used elsewhere digital assistant 201 may search the actions and metadata one at a time.

In some examples, digital assistant 201 determines whether the command matches a portion of the metadata associated with an action of an application open on electronic device 400. For example, because spoken input 504 "add a picture of a dog" is received when word processing application 505 is open, digital assistant 201 searches metadata associated with actions and sub-actions of application 505 to determine whether the command "add" matches a portion of the metadata. Digital assistant 201 may then determine that the command "add" matches metadata associated with the action "insert."

In some examples, determining whether the command matches at least a portion of a metadata associated with an action of link interface 202 includes determining whether the command matches metadata associated with active actions of the open application. For example, when spoken input 404 is received and the command "bold" identified, digital assistant 201 may search the actions of "edit" including the sub-actions "bold," "italicize," and "underline" and the metadata associated with those actions because those actions are active (e.g., displayed) on electronic device 400.

In some examples, determining whether the command matches at least a portion of the metadata associated with an action of link interface 202 includes determining whether the command matches metadata associated with inactive actions of the open application. For example, when spoken input 504 is received and the command "add" identified, digital assistant 201 may search all of the actions and the metadata associated with those actions, including the action "insert" even when those actions are inactive (e.g., not displayed) on electronic device 500.

In some examples, determining whether the command matches at least a portion of a metadata associated with an action of link interface 202 includes searching the metadata associated with a plurality of open applications. For example, several applications including a navigation application, a restaurant reservation application, and a web browsing application may be open in addition to application 405 on electronic device 400 when spoken input 404 is received. Thus, digital assistant 201 may search the actions and associated metadata for each of the navigation application, the restaurant reservation application, and the web browsing application to determine whether any of their actions or the associated metadata matches the command "bold."

In some examples, determining whether the command matches at least a portion of the metadata associated with an action of link interface 202 includes determining whether the command matches metadata associated with the application that is the focus of the electronic device. Thus, as in the example described above when several different applications may be open on electronic device 400, digital assistant 201 will search the link model of link interface 202 that is associated with application 405 which is the focus of electronic device 400 (e.g., is currently being displayed).

In some examples, determining whether the command matches at least a portion of the metadata associated with an action of link interface 202 includes determining whether the command matches metadata associated with the application that is a preferred application of the user. Thus, digital assistant 201 will search the link model of link interface 202 that is associated with an application that the user has previously indicated is their preferred application for a specific task.

In some examples, digital assistant 201 determines an action that corresponds to a command by providing the command to a machine learned language understanding model and receiving an action from the machine learned language understanding model. In some examples, the machine learned language understanding model is trained using data derived from the metadata of link models 305 and accordingly is trained to match commands to actions of link models 305 based on the data derived from the metadata. Thus, digital assistant 201 determining an action that corresponds to a command includes more than simply searching the actions and metadata of link models 305. Rather, digital assistant 201 can use the machine learned language understand model to compare the received commands to the underlying data representing the actions and metadata to determine actions that may not be understood through matching or similar means.

In some examples, determining whether the command matches an action or a portion of the metadata associated with an action of link interface 202 includes determining a confidence score representing how well the command matches an action or a portion of the metadata. In some examples, determining the confidence score includes determining a confidence score for each possible application of the plurality of applications associated with the link models 305 of link interface 202. For example, when the command "add a new document," is provided, digital assistant 201 may determine that the command could match an action of "creating a word processing document," and "creating a PDF," of a word processing application and a PDF application, respectively. Accordingly, digital assistant 201 determines a confidence score associated with each of the applications based on the received command and the possible actions. Thus, digital assistant 201 may determine that because "document" is included in the input, the confidence score for the word processing application is higher. Thus, digital assistant 201 may select the word processing application and the action "creating a word processing document," as the action that matches the provided command.

After finding an action or a portion of metadata that matches the command of spoken input 204 (e.g., determining that the command matches at least the portion of metadata associated with the action), digital assistant 201 associates the command with the action and stores this association for subsequent use with the application by digital assistant 201. For example, after determining that the action "bold" matches the command "bold" of spoken input 404, digital assistant 201 associates the command "bold" with the action "bold" and saves this association in link interface 202 or another database for easy reference. In this way, digital assistant 201 will recognize that when "bold" is provided in a future spoken input, the user intends to call the "bold" action of application 405 and execute the "bold" action without performing the determination described above.

In some examples, digital assistant 201 further stores a portion of the metadata with the association of the command with the action. In some examples, digital assistant 201 stores the portion of the metadata that matches the command with the association of the command with the action. For example, after determining that the command "add" matches the action "insert" based on the synonym "add" being present in the metadata associated with the "insert" action, digital assistant 201 will store an association between the command "add" and the action "insert" and may further annotate this association with metadata representing that this connection was made by using a synonym. In this way, the developers of application 505 or other interested may parties may reference how digital assistant 201 is making the relevant determinations and which data stored in link interface 202 has been used.

In some examples, digital assistant 201 stores the association of the command with the action within the link model of link interface 202 associated with the relevant application. In some examples, digital assistant 201 stores the association of the command with the action in a separate database, such as a database maintained by digital assistant 201 for quick access of learned commands. In some examples, digital assistant 201 stores the association of the command in a database dedicated to frequently used commands, newly learned commands, or recently used commands. For example, digital assistant 201 may add the commands "bold" and "add" to a list of recently used commands which may be accessed for further reference. Similarly, digital assistant 201 may add the commands "bold" and "add" to a list of newly learned commands for further reference.

After storing the determined association, digital assistant 201 executes the command with the application by accessing application interface 203. For example, digital assistant 201 may send the command to the appropriate application through application interface 203. In this way, digital assistant 201 invokes the command and handles the interaction between the user and the application without requiring the user to engage directly with the application. In some examples, digital assistant 201 provides a prompt confirming the command before executing the action. For example, after digital assistant 201 has determined the action "insert" associated with the command "add," digital assistant 201 may provide the audio prompt "would you like to insert a picture?" The user may then provide a positive or negative response to the prompt and digital assistant 201 will perform or abstain from performing the appropriate action based on the provided response.

In some examples, digital assistant 201 may add the command or the application to a list of favorites associated with a user of the electronic device. In some examples, digital assistant 201 adds the command and/or the application to the list of favorites when instructed by the user. In some examples, digital assistant 201 adds the command to the list of favorites after the command has been received a predetermined number of times (e.g., 5, 10, 15, 20, etc.). In some examples, digital assistant 201 adds the application to the list of favorites after the application has been accessed or opened a predetermined number of times (e.g., 5, 10, 15, 20, etc.).

In some examples, digital assistant 201 may determine a plurality of actions that it has previously accessed and the associated metadata with each of the plurality of actions and compile the actions and metadata into a transcript. For example, digital assistant 201 may keep a database of the commands received and the actions associated with them for future reference, as discussed above. Accordingly, digital assistant 201 may access this database and compile the data into a transcript that shows which commands were received and which actions they corresponded to, as well as the metadata associated with those actions. In some examples, digital assistant 201 determines the transcript by logging function calls when actions or tasks are executed and the associated code is compiled. Accordingly, in some examples, the transcript referenced by digital assistant 201 may be created over time as various action or tasks are requested and executed.

In some examples, digital assistant 201 may determine a plurality of actions that have previously been performed based on detected input on a GUI of a device running digital assistant 201. For example, a user may provide an input on a GUI of a device to highlight a portion of the screen or select a button displayed on the screen. These actions may also be logged in the transcript and/or a database and then referenced by digital assistant 201 to resolve ambiguity of a spoken input as discussed below. Further, the transcript determined by digital assistant 201 may include both the plurality of actions based on detected input on a GUI and actions performed by digital assistant 201 based on spoken input. Thus, the transcript may include the various actions performed on the device and requested by the user, which increases the responsiveness of digital assistant 201 and helps digital assistant 201 understand the various user requests.

In some examples, digital assistant 201 may receive an ambiguous spoken input and use the transcript to resolve the ambiguous spoken request. In some examples, using the transcript to resolve the ambiguous spoken request includes determining an action to execute based on the transcript and an ambiguous term of the spoken request. For example, after receiving the spoken input 504 "add a picture of a dog," associating the action "insert" with the command "add" and inserting a picture into a document, digital assistant 201 may receive the spoken input "rotate it." Thus, the second received spoken input contains the ambiguous term "it" which digital assistant 201 must resolve to perform the provided command "rotate." Accordingly, digital assistant 201 may access the transcript of previous actions and determine that "it" likely refers to the picture from the previous command based on factors such as when the different inputs were received, whether the received commands or their associated actions are related, and the historical interaction between the user and digital assistant 201.

In some examples, spoken input 204 is received by system 200 without an application open on the electronic device. For example, digital assistant 201 may receive the spoken input 504 "add a picture of a dog," and then electronic device 500 may receive an indication to close application 505. Subsequently, digital assistant 201 may receive the spoken input "rotate it." When no application is open on the electronic device, digital assistant 201 determines whether a command of the spoken input (e.g., rotate) matches at least a portion of metadata associated with an action of a plurality of applications available (e.g., installed) to digital assistant

201, as discussed above. In some examples, actions of link model 305 be annotated as global actions, which are actions that may be called or performed even when the associated application is not active or running. Accordingly, digital assistant 201 may call the global actions of link model 305 based on matching at least a portion of the metadata.

In some examples, digital assistant 201 determines the actions and metadata search by determining a subset of the applications available. In some examples, the subset of applications includes applications listed in the transcript. In some examples, the subset of applications includes applications accessed frequently by digital assistant 201. In some examples, applications accessed frequently by digital assistant 201 are applications accessed more than a predetermined threshold in a predetermined period of time. For example, application accessed more than 10 times in a 5 day period may be considered to be accessed frequently. In some examples, the subset of applications includes applications that are marked as favorites by digital assistant 201, as described above. In some examples, applications that are marked as favorites are applications that are marked as favorites in a user profile associated with a user that provided the spoken input.

After determining the subset of applications, digital assistant 201 searches the actions and associated metadata for each of the applications in link interface 202 to determine whether any of the actions or associated metadata matches the command, as discussed above with respect to other examples. Accordingly, digital assistant 201 may determine when an action or metadata associated with the action matches the command, associate the command with the action, and store the association for future reference.

In some examples, digital assistant 201 receives another spoken input including the same command after storing the association between the command and the action. Accordingly, digital assistant 201 accesses the stored association, retrieves the stored action, and executes the action in the appropriate application. For example, digital assistant 201 may receive the spoken input "add a graph of this data" after previously associating the command "add" with the action "insert." Accordingly, digital assistant 201 may access the stored association, retrieve the action of "insert," and cause the word processing application 505 to insert a graph.

Figure 6:
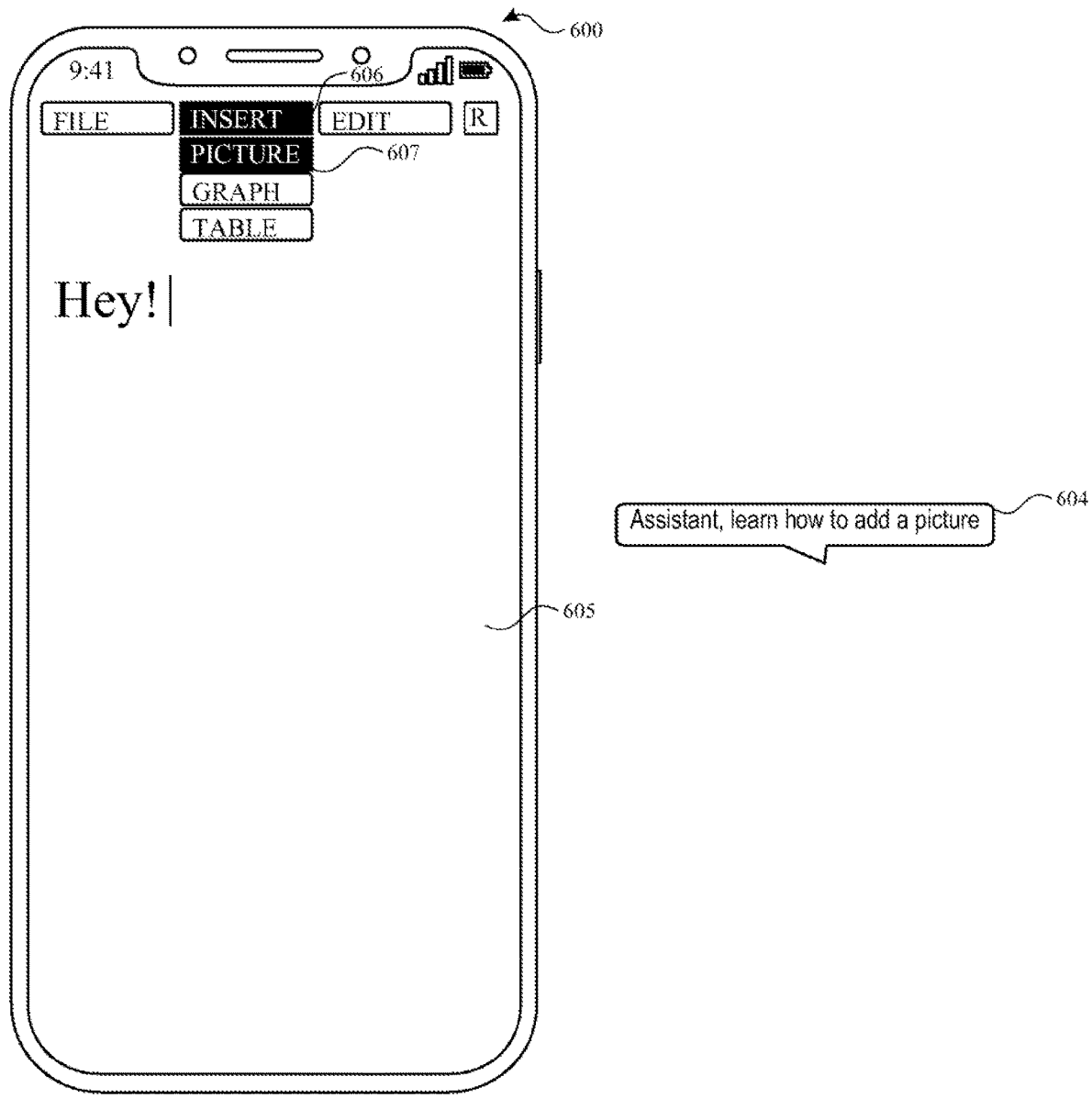
FIG. 6 depicts an example input command to be mapped and executed.

In some examples, digital assistant 201 receives a spoken input instructing digital assistant 201 to associate a command with an action, as shown in FIG. 6. For example, digital assistant 201 may receive the spoken input 604 "assistant, learn how to add a picture." When digital assistant 201 receives such a spoken input, digital assistant 201 begins recording activity performed with electronic device 600 to determine which action of application 605 should be associated with the command "add."

Subsequently, digital assistant 201 records activity including the selection of the insert tab 606 and the selection of a picture category 607 under the insert tab. Digital assistant 201 then associates the "insert" action and the selected category with the command "add" and stores the association as discussed above. In some examples, the selection of various user interface elements is a selection using a voice input. For example, the user may provide the input "select insert" after starting the recording process. In some examples, the selection of the user interface elements is a tap on a touch sensitive screen of electronic device 605.

In some examples, the association of the command with the action and recorded activity is stored in the same manner as the association of the commands, actions, and metadata discussed above. Accordingly, these associations may be accessed by digital assistant 201 to resolve subsequent commands and to execute the required action.

Figure 7:
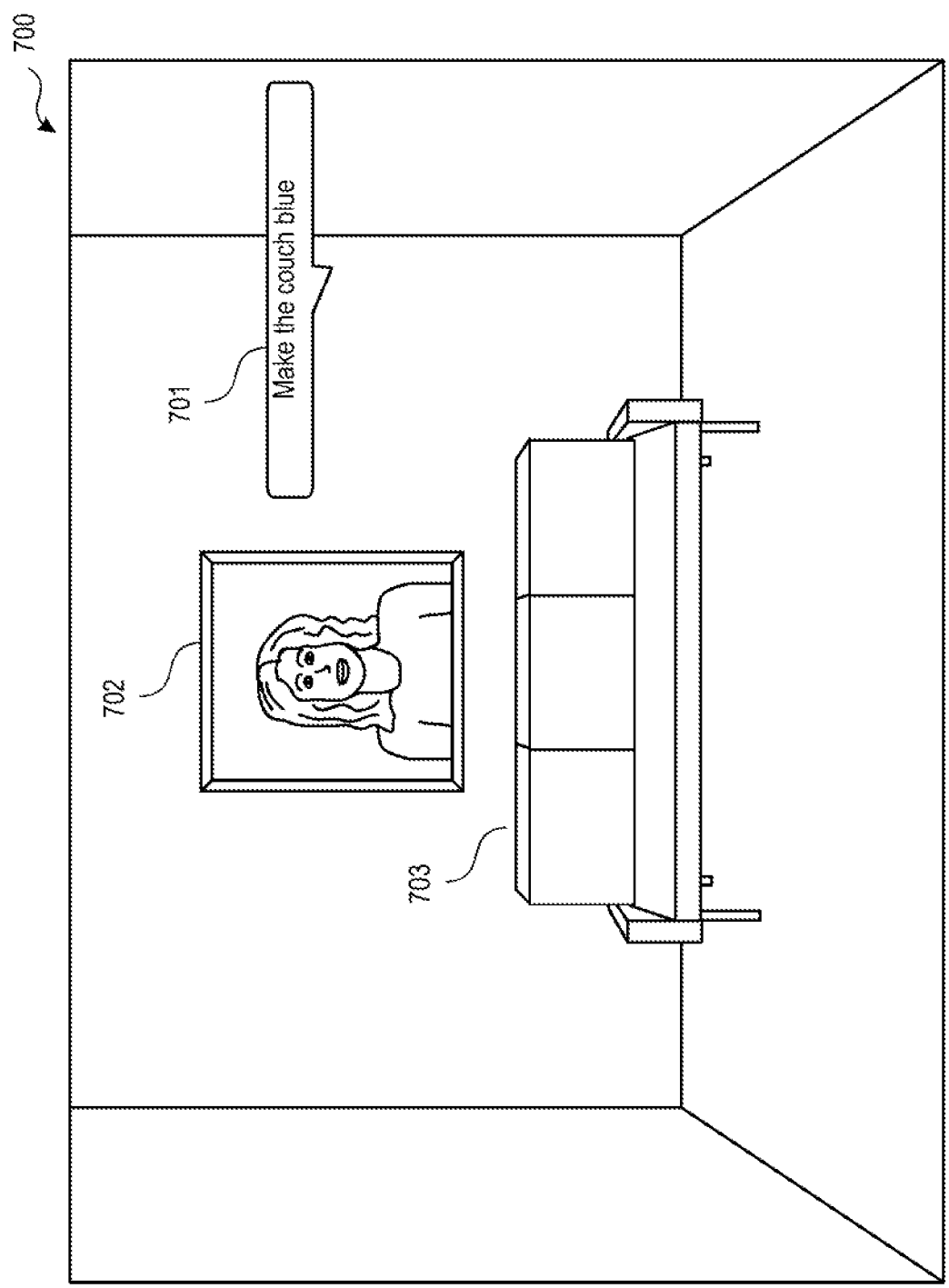
FIG. 7 depicts an example input command to be mapped and executed.

In some examples, system 200 and digital assistant 201 are part of a system or electronic device for creating or interacting with a VR, MR, or AR environment, as shown in FIG. 7. Thus, electronic device 100, or a similar electronic device may produce a VR environment including one or more virtual objects that digital assistant 201 may interact with based on user input. In some examples, electronic device 100 may generate or receive a view of the virtual environment, including the one or more virtual objects. For example, as shown in FIG. 7, electronic device 100 may receive view 700 including a virtual painting 702 and a virtual couch 703. In some examples, virtual painting 702 and virtual couch 703 are generated based on user specified parameters. In some examples, virtual painting 702 and virtual couch 703 are generated based on predetermined parameters.

While interacting with view 700, digital assistant 201 may receive a spoken input 701 including a command that digital assistant 201 does not recognize, similar to the spoken inputs 404 and 504 described above. For example, digital assistant 201 may receive spoken input 701 "make the couch blue," as shown in FIG. 7, and may not recognize the command "make." Accordingly, digital assistant 201 determines whether the command of spoken input 701 matches an action, sub-action, or at least a portion of the metadata of a link model (e.g., link model 305) of link interface 202 to determine which action should be performed, as described above.

In some examples, digital assistant 201 accesses link models of applications that are open (e.g., running) on electronic device 100 that is producing (e.g., generating, receiving) view 700. For example, to generate view 700 including virtual painting 702 and virtual couch 703, electronic device 100 may have an art history application and an interior design application open simultaneously. These applications may allow electronic device 100 to retrieve the data required to generate and display virtual painting 702 and virtual couch 703 including what the painting look likes, which colors the couch is available in, etc. Thus, digital assistant 201 accesses and searches the link models corresponding to the art history application and the interior design application because those applications are currently open (e.g., in use).

Digital assistant 201 prioritizes these applications even though they are not a focus of the electronic device 100 or digital assistant 201. That is, in a virtual or augmented reality environment, the applications open (e.g., running) to create the environment and the associated objects are often not currently displayed by electronic device or digital assistant 201. However, digital assistant 201 is able to recognize that these applications are likely relevant to received spoken input 701 because they are actively working to produce view 700.

In some examples, digital assistant 201 accesses link models of applications that are displayed by electronic device 100 and/or digital assistant 201. For example, while electronic device 100 is providing view 700, digital assistant 201 may receive an input to open a messaging application and then display the messaging application as a part of view 700. Further, digital assistant 201 may receive a spoken input "open my new e-mail," and may not recognize the command "open." Accordingly, digital assistant 201 may access a link model associated with the messaging application because the messaging application is currently displayed as a part of view 700.

Similarly, in some examples, digital assistant 201 accesses link models of applications that are the focus of electronic device 100 and/or digital assistant 201. For example, electronic device 100 may display a virtual TV as a part of view 700 and provide for display on the virtual TV content from a streaming application. Concurrently, electronic device 100 may display a messaging application including several e-mails. Digital assistant 201 may receive the input "open my new e-mail" while the view 700 of electronic device 100 is focused (e.g., facing towards) the messaging application. Accordingly digital assistant 201 will access and prioritize searching the link model associated with the messaging application rather than the link model associated with the streaming application because the messaging application is the focus of electronic device 100.

After determining which link models to access and search, digital assistant 201 may compare the command to the action, sub-actions, and metadata of the one or more link models of link interface 202 to determine whether any of the action, sub-actions, or metadata match the command. Upon determining that one of the actions, sub-actions, or metadata matches the command, digital assistant 201 may associate the respective action with the command and store the association for further use, as discussed above.

In some examples, spoken input 701 may include an ambiguous reference and digital assistant 201 may access the transcript to resolve the ambiguity. For example, digital assistant 201 may receive the spoken input "make it blue" and may not immediately understand what object is being reference by "it." Accordingly, digital assistant 201 may review the transcript to determine recent actions that were taken and which objects the actions were performed on. Digital assistant 201 may then determine that the color of digital couch 703 was recently changed to red and thus the user likely would like to change the color of digital couch 703 from red to blue. Thus, digital assistant 201 may determine that "it" is referencing digital couch 703.

As another example, digital assistant 201 may receive the spoken input "bring it back," and be unable to determine what "it" is referencing. Accordingly, digital assistant 201 may review the transcript to determine that the user recently provided the spoken input "delete the couch," following which digital assistant 201 removed digital couch 703 from view 700. Thus, digital assistant 201 may determine that the user is likely referencing the couch with "it."

It will be appreciated that accessing the action, sub-actions, and metadata of system 200 using digital assistant 201 in this manner can be advantageous in VR, MR, and AR environments such as those described above as new virtual and physical objects are being added and removed to the view of electronic device frequently. Thus digital assistant 201 can adapt to new objects, new commands, and new applications quickly without requiring the user or a developer to provide extensive training, creating a more enjoyable and immersive experience to the user.

Figure 8:
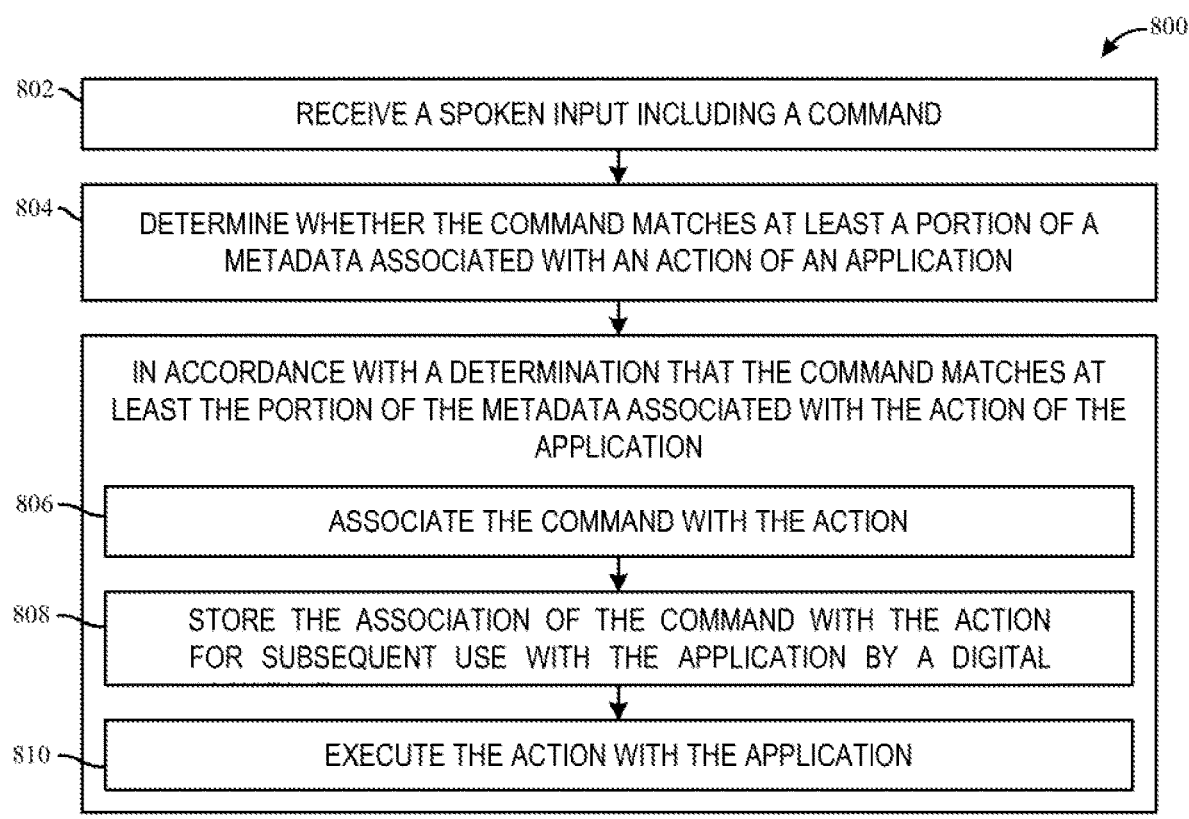
FIG. 8 is a flow diagram illustrating a process for mapping and executing user commands.

FIG. 8 is a flow diagram illustrating a process for mapping and executing a user command, according to various examples. Method 800 is performed at a device (e.g., device 100, 400, 500, 600) with one or more input devices (e.g., a touchscreen, a mic, a camera), and a wireless communication radio (e.g., a Bluetooth connection, WiFi connection, a mobile broadband connection such as a 4G LTE connection). In some embodiments, the electronic device includes a plurality of cameras. In some embodiments, the electronic device includes only one camera. In some examples, the device includes one or more biometric sensors which, optionally, include a camera, such as an infrared camera, a thermographic camera, or a combination thereof. Some operations in method 700 are, optionally, combined, the orders of some operations are, optionally, changed, and some operations are, optionally, omitted.

At block 802, while an application (e.g., application 405, 505, 605) is open, a spoken input (e.g., spoken input 204, 404, 504, 604) including a command is received. In some examples, the application open on the electronic device (e.g., device 100, 400, 500, 600) is the focus of the electronic device. In some examples, the application open on the electronic device is one of a plurality of open applications.

At block 804 whether the command matches at least a portion of a metadata (e.g., metadata 308) associated with an action (e.g., action 306, sub-action 307) of the application (e.g., application 405, 505, 605) is determined. In some examples, determining whether the command matches at least a portion of metadata associated with an action of the application further comprises determining whether the command matches at least a portion of metadata associated with an action of any of the plurality of open applications.

In some examples, the action (e.g., action 306, sub-action 307) of the application (e.g., application 405, 505, 605) is an active action. In some examples, the action of the application is one of a plurality of actions, and the plurality of actions includes a plurality of active actions and a plurality of inactive action. In some examples, the plurality of active actions are actions that are currently displayed by the application. In some examples, the plurality of inactive actions are actions that are not currently displayed by the application.

In some examples, the plurality of actions (e.g., action 306, sub-action 307) are presented in a tree link model (e.g., link model 305). In some examples, the tree link model includes a plurality of hierarchal links between related actions of the plurality of actions.

In some examples, each of the plurality of actions (e.g., action 306, sub-action 307) is associated with a respective portion of the metadata (e.g., metadata 308). In some examples, the metadata includes synonyms of the action. In some examples, the metadata includes an ontology corresponding to the action.

At block 806, in accordance with a determination that the command matches at least the portion of the metadata (e.g., metadata 308) associated with the action (e.g., action 306, sub-action 307) of the application (e.g., application 405, 505, 605) the command is associated with the action.

At block 808, the association of the command with the action (e.g., action 306, sub-action 307) is stored for subsequent use with the application (e.g., application 405, 505, 605) by the digital assistant (e.g., digital assistant 201). In some examples, in accordance with a determination that the command matches at least the portion of the metadata (e.g., metadata 308) of the action of the application the portion of the metadata is stored with the association of the command with the action.

At block 810, the action (e.g., action 306, sub-action 307) is executed with the application (e.g., application 405, 505, 605).

In some examples, a plurality of actions (e.g., action 306, sub-action 307) previously accessed by the digital assistant (digital assistant 201) is determined. In some examples, the respective metadata (e.g., metadata 308) associated with each of the plurality of actions (e.g., application 405, 505, 605) previously accessed by the digital assistant is determined. In some examples, the plurality of actions and the respective metadata are compiled into a transcript. In some examples, the transcript is provided to resolve an ambiguous request.

In some examples, the spoken input (e.g., spoken input 204, 404, 504, 604) is received without an application (e.g., application 405, 505, 605) open on the electronic device (e.g., device 100, 400, 500, 600). In some examples, whether the command matches at least a portion of a metadata (e.g., metadata 308) associated with an action (e.g., action 306, sub-action 307) of the plurality of applications is determined. In some examples, the plurality of applications includes applications listed in the transcript. In some examples, the plurality of applications includes applications that are accessed frequently by the digital assistant (e.g., digital assistant 201). In some examples, the plurality of applications includes applications that are marked as favorites in a user profile associated with a user that provided the spoken input. In some examples, the action is an action previously stored in association with the command and the application.

In some examples, a spoken input (e.g., spoken input 204, 404, 504, 604) to associate a second command with a second action (e.g., action 306, sub-action 307) is received. In some examples, activity on the electronic device (e.g., device 100, 400, 500, 600) is recorded. In some examples, the recorded activity is stored as the second action and the association of the second command with the second action is stored for subsequent use by the digital assistant (e.g., digital assistant 201).

Figure 9:
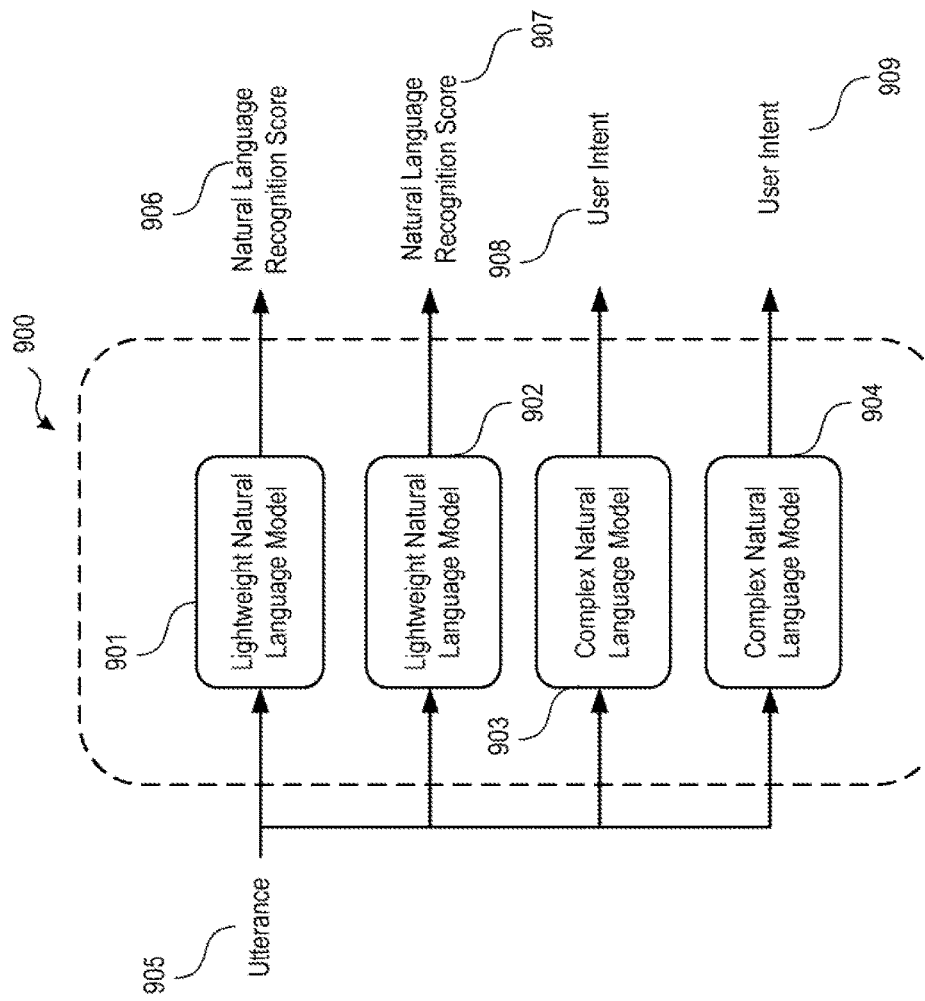
FIG. 9 depicts an exemplary digital assistant for performing natural language processing.

FIG. 9 depicts exemplary digital assistant 900 for performing natural language processing. In some examples, as illustrated in FIG. 9, digital assistant 900 includes lightweight natural language model 901, lightweight natural language model 902, complex natural language model 903, and complex natural language model 904. In some examples, digital assistant 900 is implemented on electronic device 100. In some examples, digital assistant 900 is implemented across other devices (e.g., a server) in addition to electronic device 100. In some examples, some of the modules and functions of digital assistant 900 are divided into a server portion and a client portion, where the client portion resides on one or more user devices (e.g., electronic device 100) and communicates with the server portion through one or more networks. It should be noted that digital assistant 900 is only one example and that digital assistant 900 can have more or fewer components than shown, can combine two or more components, or can have a different configuration or arrangement of the components. The various components of digital assistant 900 are implemented in hardware, software instructions for execution by one or more processors, firmware, including one or more signal processing and/or application specific integrated circuits, or a combination thereof.

Digital assistant 900 receives utterance 905 from a user and determines user intent 908 corresponding to utterance 905. As discussed further below, digital assistant 900 provides utterance 905 to one or more lightweight natural language models to determine corresponding natural language recognition scores. Based on these natural language recognition scores, digital assistant 900 determines whether to provide the utterance to a complex natural language model associated with an application that is also associated with the corresponding lightweight natural language model. The complex natural language model may then determine user intent 908 corresponding to utterance 905.

In some examples, utterance 905 is received from the user during an active digital assistant session between the user and digital assistant 900. For example, utterance 905 of "order me a car to the airport" may be received from the user during a conversation or exchange in which the user asked digital assistant 900 "what time is it?" and digital assistant 900 responds "2:15 PM." Thus, utterance 905 is received as part of an ongoing exchange between the user and digital assistant 900.

In some examples, utterance 905 is received from the user outside of an active digital assistant session between the user and digital assistant 900. Accordingly, digital assistant 900 determines whether utterance 905 is intended for digital assistant 900 or for someone else. In some examples, digital assistant 900 determines whether utterance 905 is intended for digital assistant 900 based on factors such as the view and/or orientation of electronic device 100, the direction the user is facing, the gaze of the user, the volume of utterance 905, a signal to noise ratio associated with utterance 905, etc. For example, utterance 905 of "order me a car to the airport," may be received from the user when the user is looking at device 100. Accordingly, the view of electronic device 100 may be the users face and the volume of utterance 905 may be indicative that the user is looking at electronic device 100. Thus, digital assistant 900 may determine that the user intended to direct utterance 905 to digital assistant 900.

In some examples, utterance 905 includes a trigger phrase. In some examples, digital assistant 900 determines whether utterance 905 includes a trigger phrase and launches a digital assistant session in accordance with a determination that utterance 905 includes the trigger phrase. For example, utterance 905 may include "assistant, order me a car to the airport." Accordingly, digital assistant 900 determines that the word "assistant" is a trigger phrase and thus launches a digital assistant session to interact with the user.

Accordingly, in some examples, digital assistant 900 pre-processes utterance 905 prior to providing utterance 905 to lightweight natural language model 901 and lightweight natural language model 902, as described further below. In some examples, pre-processing of utterance 905 includes determining a start point and/or an end point of utterance 905. For example, when utterance 905 of "order me a ride to the airport" is received as part of an ongoing conversation between the user and digital assistant 900, digital assistant 900 may preprocess the received audio to determine which portion of the conversation is utterance 905. Accordingly, digital assistant 900 may determine which portion of the conversation is needed for further processing by the natural language models discussed in more detail below.

Once utterance 905 is received (and optionally, preprocessed) by digital assistant 900, digital assistant 900 provides utterance 905 to lightweight natural language model 901 and lightweight natural language model 902. In some examples, lightweight natural language model 901 is associated with a first application and lightweight natural language model 902 is associated with a second application different from the first application.

Lightweight natural language models 901 and 902 are abbreviated natural language models capable of determining whether further processing of utterance 905 is required. In particular, after receiving utterance 905, lightweight natural language model 901 then determines natural language recognition score 906 for utterance 905 and lightweight natural language model 902 determines natural language recognition score 907 for utterance 905. Because each of lightweight natural language models 901 and 902 are associated with a respective first and second application, natural language recognition score 906 determined by lightweight natural language model 901 is associated with the first application and natural language recognition score 907 determined by lightweight natural language model 902 is associated with the second application.

Thus, lightweight natural language models 901 and 902 determine whether further processing of utterance 905 is required to perform a task with either the first application or the second application based on utterance 905. Accordingly, lightweight natural language models 901 and 902 are relatively simple models used to determine whether utterance 905 should be provided to complex natural language models for each of the applications to determine user intents.

In some examples, determining natural language recognition score 906 for utterance 905 includes determining whether utterance 905 is relevant to the first application associated with lightweight natural language model 901. In particular, lightweight natural language model 901 can parse utterance 905 for specific words or phrases that are related to topics or tasks of the first application and determine natural language recognition score 906 based on the presence of those words or phrases, how those words or phrases are used in utterance 905, etc.

For example, when lightweight natural language model 901 is associated with a rideshare application, lightweight natural language model 901 may parse utterance 905 for words or phrases related to driving, cars, locations, travel, etc. and determine natural language recognition score 906 based whether utterance 905 includes those words, how close those words are together, etc. Thus, when utterance 905 "order me a car to the airport" is processed by lightweight natural language model 901, lightweight natural language model 901 may determine that utterance 905 is relevant to the rideshare application because of the presence of the words "car" and "airport" in utterance 905 as well as their relative position. Accordingly, natural language recognition score 906 determined by lightweight natural language model 901 may be relatively high because utterance 905 is determined to be relevant to the rideshare application.

Conversely, when utterance 905 is "what is the weather in Germany?," lightweight natural language model 901 may determine that utterance 905 is not relevant to the rideshare application, because the word "weather" is not related to a rideshare and while the use of "Germany" could be related to travel, nothing else in utterance 905 is related to a rideshare. Thus, natural language recognition score 906 determined by lightweight natural language model 901 may be relatively low because utterance 905 is determined not to be relevant to the rideshare application.

Similarly, in some examples, determining natural language recognition score 907 for utterance 905 includes determining whether utterance 905 is relevant to the second application associated with lightweight natural language model 902. In particular, lightweight natural language model 902 can parse utterance 905 for specific words or phrases that are related to topics or tasks of the second application and determine natural language recognition score 907 based on the presence of those words or phrases, how those words or phrases are used in utterance 905, etc.

For example, when lightweight natural language model 902 is associated with a weather application, lightweight natural language model 902 may parse utterance 905 for words or phrases related to locations, travel, weather, climate, temperature, cloud cover etc. and determine natural language recognition score 907 based whether utterance 905 includes those words, how close those words are together, etc. Thus, when utterance 905 is "what is the weather in Germany?" lightweight natural language model 902 may determine that utterance 905 is relevant to the weather application because of the presence of the words "weather" and "Germany" in utterance 905 as well as their relative position. Accordingly, natural language recognition score 907 determined by lightweight natural language model 902 may be relatively high because utterance 905 is determined to be relevant to the weather application.

Conversely, when utterance 905 is "order me a car to the airport," lightweight natural language model 902 may determine that utterance 905 is not relevant to the weather application, because the word "car" is not related to weather and while the use of "airport" could be related to weather, nothing else in utterance 905 is related to weather. Thus, natural language recognition score 907 determined by lightweight natural language model 902 may be relatively low because utterance 905 is determined not to be relevant to the weather application.

In some examples, after natural language recognition scores 906 and 907 are determined, natural language recognition scores 906 and 907 are adjusted based on context data associated with the electronic device (e.g., electronic device 100) on which digital assistant 900 is operating. Context data associated with the electronic device includes various characteristics of the electronic device. For instance, context data may indicate a location of the electronic device (e.g., GPS coordinates), whether the electronic device is connected to a network (e.g., WiFi network), whether the electronic device is connected to one or more other devices (e.g., headphones), and/or a current time, date, and/or weekday. If the electronic device is connected to a network or device, the context data may further indicate a name and/or type of the network or device, respectively.

As an example, when utterance 905 "what is the weather in Palo Alto?" is received the context data may include GPS coordinates indicating electronic device 100 is located in San Francisco. Accordingly, digital assistant 900 may adjust natural language recognition score 906 associated with the rideshare application by increasing natural language recognition score 906 because it is more likely that the user is interested in a rideshare to Palo Alto given the user's relatively close location in San Francisco. Thus, natural language recognition score 906 is adjusted because digital assistant 900 recognizes that utterance 905 is more relevant to the rideshare application based on electronic device 100's location.

In some examples, after natural language recognition scores 906 and 907 are determined, natural language recognition scores 906 and 907 are adjusted based on a view of the electronic device (e.g., electronic device 100) on which digital assistant 900 is operating. For example, when utterance 905 is "when is the next time they play?" and natural language recognition score 907 is associated with a sports scores application, natural language recognition score 907 may initially be determined to be relatively low. However, the view of electronic device 100 may include a poster of the San Francisco Giants. Accordingly, digital assistant 900 determines that utterance 905 is relevant to the sports scores application and natural language recognition score 907 may be increased because of the view including the poster.

In some examples, natural language recognition scores 906 and 907 are adjusted based on a view of a virtual environment generated by electronic device 100 or a similar electronic device. For example, when utterance 905 is "what's playing right now?" and natural language recognition score 906 is associated with a media application, natural language recognition score 906 may be increased because the view of the electronic device 100 includes a virtual environment with a virtual television. Accordingly, digital assistant 900 may determine that utterance 905 is relevant to the media application because of the view including the virtual television.

After natural language recognition score 906 is determined by lightweight natural language model 901 (and optionally adjusted), digital assistant 900 determines whether natural language recognition score 906 exceeds a predetermined relevancy threshold. In accordance with a determination that natural language recognition score 906 exceeds the predetermined relevancy threshold, digital assistant 900 determines that utterance 905 is relevant to the first application. Accordingly, digital assistant 900 provides utterance 905 to complex natural language model 903 to determine user intent 908 corresponding to utterance 905. Conversely, in accordance with a determination that natural language recognition score 906 does not exceed the predetermined relevancy threshold, digital assistant 900 determines that utterance 905 is not relevant to the first application and does not provide utterance 905 to complex natural language model 903.

For example, when utterance 905 is "order me a car to the airport," and thus natural language recognition score 906 associated with the rideshare application is relatively high, digital assistant 900 may determine that natural language recognition score 906 exceeds the predetermined relevancy threshold and provide utterance 905 to complex natural language model 903 to determine user intent 908. Alternatively, when utterance 905 is "what is the weather in Germany?," and thus natural language score 906 associated with the rideshare application is relatively low, digital assistant 900 may determine that natural language recognition score 906 does not exceed the predetermined relevancy threshold and does not provide utterance 905 to complex natural language model 903.

Similarly, after natural language recognition score 907 is determined by lightweight natural language model 902, digital assistant 900 determines whether natural language recognition score 907 exceeds a predetermined relevancy threshold. In accordance with a determination that natural language recognition score 907 exceeds the predetermined relevancy threshold, digital assistant 900 determines that utterance 905 is relevant to the second application. Accordingly, digital assistant 900 provides utterance 907 to complex natural language model 904 to determine user intent 909 corresponding to utterance 905. Conversely, in accordance with a determination that natural language recognition score 907 does not exceed the predetermined relevancy threshold, digital assistant 900 determines that utterance 905 is not relevant to the second application and does not provide utterance 905 to complex natural language model 904.

For example, when utterance 905 is "what is the weather in Germany?," and thus natural language recognition score 907 associated with the weather application is relatively high, digital assistant 900 may determine that natural language recognition score 907 exceeds the predetermined relevancy threshold and provide utterance 905 to complex natural language model 904 to determine user intent 909. Alternatively, when utterance 905 is "order me a car to the airport," and thus natural language score 907 associated with the weather application is relatively low, digital assistant 900 may determine that natural language recognition score 907 does not exceed the predetermined relevancy threshold and does not provide utterance 905 to complex natural language model 904.

Complex natural language models 903 and 904 are detailed natural language models capable of performing full natural language processing on utterance 905 to determine a user intent (e.g., user intents 908 and 909) and a task associated with the user intent. Accordingly, when complex natural language model 903 and complex natural language model 904 receive utterance 905, complex natural language model 903 determines user intent 908 corresponding to utterance 905 and complex natural language model 904 determines user intent 909 corresponding to utterance 905. In some examples, complex natural language models 903 and 904 also determine one or more parameters for a task corresponding to the determined user intent.

For example, when utterance 905 is "order me a car to the airport," complex natural language model 903 associated with a rideshare application determines that user intent 908 is to order a rideshare from their current location to the airport. Accordingly, complex natural language model 903 determines that the task corresponding to the determined intent is a rideshare task and that parameters for the rideshare task include a starting location of the user's current location and an ending location of the nearest airport.

As another example, when utterance 905 is "what is the weather in Germany?," complex natural language model 904 associated with a weather application determines that user intent 909 is to determine the current weather in the country of Germany. Accordingly, complex natural language model 904 determines that the task corresponding to the determined intent is looking up the weather and that parameters for the task include coordinates for a location in Germany.

In some examples, prior to receiving utterance 905, lightweight natural language model 901 and lightweight natural language model 902 are trained to determine whether utterances are relevant to the first application and the second application respectively. In some examples, lightweight natural language model 901 is trained with a first set of training data associated with the first application. In some examples, the first set of training data includes a set of utterances that are relevant to the first application. For example, when the first application is a rideshare application the first set of training data includes utterances like "where is my car?," "get me a ride home," "schedule a ride home from the airport," "take me to the movies," "is the car on its way?," etc.

In some examples, lightweight natural language model 901 is trained by calibrating a natural language recognition score based on a plurality of utterances of the first set of training data that are not relevant to the first application. For example, a plurality of utterance that are not relevant to a rideshare application such as "how hot is it?," "what's the temperature outside?," "will it be sunny next week?," "what's it like in Florida?," and "tell me the forecast for next Tuesday," are provided to lightweight natural language model 901 so that natural language model 901 is trained which utterances are not relevant to the rideshare application.

Accordingly, when the first set of training data is providing to lightweight natural language model 901, lightweight natural language model 901 is trained to determine that the set of utterances included in the first set of training data and similar utterances are relevant to the first application based on the factors discussed above including the presence of certain terms or phrases, the placement of those terms, the relationship between the terms and phrases, etc.

Similarly, in some examples, lightweight natural language model 902 is trained with a second set of training data associated with the second application. In some examples, the second set of training data includes a set of utterances that are relevant to the second application. For example, when the second application is a weather application the second set of training data includes utterances like "how hot is it?," "what's the temperature outside?," "will it be sunny next week?," "what's it like in Florida?," "tell me the forecast for next Tuesday," etc.

In some examples, lightweight natural language model 902 is trained by calibrating a natural language recognition score based on a plurality of utterances of the first set of training data that are not relevant to the first application. For example, a plurality of utterance that are not relevant to a weather application such as "where is my car?," "get me a ride home," "schedule a ride home from the airport," "take me to the movies," and "is the car on its way?," are provided to lightweight natural language model 902 so that natural language model 902 is trained to recognize utterances that are not relevant to the weather application.

Accordingly, when the second set of training data is providing to lightweight natural language model 902, lightweight natural language model 902 is trained to determine that the set of utterances included in the second set of training data and similar utterances are relevant to the second application based on the factors discussed above including the presence of certain terms or phrases, the placement of those terms, the relationship between the terms and phrases, etc.

Similarly, in some examples, prior to receiving utterance 905, complex natural language model 903 and complex natural language model 904 are trained to determine user intents, tasks associated with the user intents, and parameters with a set of training data including a plurality of utterances. Accordingly, various utterances such as "get me a ride to the airport," "how hot is it?," "what movies are playing?," and "what's the score of the game?," are provided to complex natural language models 908 and 909 and complex natural language models 908 and 909 are trained to recognize user intents, tasks, and parameters for those utterances.

In some examples, the lightweight natural language models and the complex natural language models are trained on a device separate from electronic device 100. In some examples, the lightweight natural language models and the complex natural language models are trained on a server and then provided to electronic device 100. In some examples, the lightweight natural language model and the complex natural language models are trained simultaneously. In some examples, the lightweight natural language model and the complex natural language models are trained at different times.

In some examples, the lightweight natural language models require less training data and therefore fewer parameters to be successfully trained and calibrated than the complex natural language models because the lightweight natural language models are simpler and perform less complex determinations. In some examples, the lightweight natural language models include a logistic regression network or a convolutional neural network and thus, process individual words or token of the utterance in parallel. In this way the lightweight natural language models process each word or token of the utterance in the context of neighboring words or tokens and not in the full context of the utterance. Accordingly, training of the lightweight natural language models is performed faster and with less processing than training of the complex natural language models.

In some examples, digital assistant 900 determines whether natural language recognition score 906 is greater than natural language recognition score 907 and in accordance with a determination that natural language recognition score 906 is greater than natural language recognition score 907 executing a task associated with user intent 908. For example, when utterance 905 is "order me a ride to the airport," and natural language recognition score 906 associated with a rideshare application is greater than natural language recognition score 907 associated with a weather application, digital assistant 900 causes the rideshare application to execute the rideshare task associated with user intent 908 of ordering a rideshare.

Similarly, in some examples, digital assistant 900 determines whether natural language recognition score 907 is greater than natural language recognition score 906 and in accordance with a determination that natural language recognition score 907 is greater than natural language recognition score 906 executing a task associated with user intent 909. For example, when utterance 905 is "what is the weather in Germany?," and natural language recognition score 907 associated with a weather application is greater than natural language recognition score 906 associated with a rideshare application, digital assistant 900 causes the weather application to execute the task of determining the weather in a location associated with user intent 909 of determining weather.

In some examples, digital assistant 900 provides utterance 905 to complex natural language model 903 associated with a first application, regardless of whether natural language recognition score 906 exceeds the predetermined relevance threshold. In particular, digital assistant 900 provides utterance 905 to complex natural language model 903 because the first application is active on electronic device 100. In some examples, the first application is active on electronic device 100 when the first application is open on electronic device 100. In some examples, the first application is active on electronic device 100 when the first application is the focus of electronic device 100.

Thus, in some examples, in accordance with a determination that the natural language recognition score 906 does not exceed the predetermined threshold, digital assistant 900 determines whether the application associated with lightweight natural language model 901 is active. In accordance with a determination that the application associated with lightweight natural language model 901 is active, digital assistant 900 provides utterance 905 to complex natural language model 903 associated with the application. Complex natural language model 903 then determines user intent 908 corresponding to utterance 905.

For example, when utterance 905 is "what is the weather in Germany?" and natural language recognition score 906 does not exceed the predetermined relevancy threshold, digital assistant 900 may determine that the rideshare application is the focus of electronic device 100 and provide utterance 905 to complex natural language model 903 for further processing.

In some examples, digital assistant 900 provides utterance 905 to all of the lightweight natural language models available to digital assistant 900. In some examples, digital assistant 900 has access to a lightweight natural language model for each of the applications installed on electronic device 100. Accordingly, digital assistant 900 can provide utterance 905 to lightweight natural language models for each application installed on electronic device 100.

In some examples, digital assistant 900 selects a subset of applications and provides utterance 905 to lightweight natural language models for each of the subset of selected applications. In some examples, the applications are selected based on preferences of the user. For example, the user may indicate to digital assistant 900 in a user setting that they prefer to use a first rideshare application over a second rideshare application. Accordingly, digital assistant 900 may automatically provide utterance 905 to a lightweight natural language model associated with the first rideshare application based on that user setting.

In some examples, the applications are selected based on historical interaction between the user and the applications. For example, digital assistant 900 may provide the user with the options of the first rideshare application and the second rideshare application several times and the user may select the second rideshare application every time. Accordingly, digital assistant 900 may determine that a user is more likely to select the second rideshare application and thus automatically provide utterance 905 to a lightweight natural language model associated with the second rideshare application based on the historical interaction of the user selecting the second rideshare application In some examples, the applications are selected based on a popularity of the applications. For example, digital assistant 900 may determine that the first rideshare application is selected more frequently by a plurality of users when seeking a rideshare. Accordingly, digital assistant 900 may automatically provide utterance 905 to a lightweight natural language model associated with the first rideshare application because digital assistant 900 determines that the first rideshare application is more popular with most users.

In some examples, the applications are selected based on how recently the applications were installed on electronic device 100. For example, digital assistant 900 may have downloaded the second rideshare application within the last day. Accordingly, digital assistant 900 may determine that because a user has recently downloaded a new rideshare application the user intends for the utterance to be provided to that rideshare application. Thus, digital assistant 900 may automatically provide utterance 905 to a lightweight natural language model associated with the second rideshare application because digital assistant 900 determines the second rideshare application was recently installed.

In some examples, digital assistant 900 may have access to a lightweight natural language model associated with an application available to digital assistant 900 but not installed on electronic device 100. Accordingly, digital assistant 900 may provide utterance 905 to this lightweight natural language model and determine a natural language recognition score with the lightweight natural language model. Further, digital assistant 900 may determine whether the natural language recognition score exceeds the predetermined threshold. If digital assistant 900 determines that the natural language recognition score exceeds the predetermined threshold then digital assistant 900 may retrieve the application associated with the lightweight natural language model (e.g., from a server) and install the application. In some examples, installing the application includes downloading a complex natural language model for the application and providing utterance 905 to the complex natural language model.

For example, when utterance 905 is "what's the score of the game?," digital assistant 900 may provide utterance 905 to a lightweight natural language model associated with a sports application that is available to digital assistant 900 but not installed on electronic device 100. The lightweight natural language model may determine that the natural language recognition score is relatively high because of the use of "score" and "game" in utterance 905. Thus, digital assistant 900 may determine that utterance 905 exceeds the predetermined relevancy threshold, retrieve the sports application from a server and install the sports application. Digital assistant 900 may then provide utterance 905 to a complex natural language model associated with the sports application to determine a user intent.

In some examples, applications that are available to digital assistant 900 are selected in the same manner that applications may be selected as discussed above.

It will be recognized that this process may incorporate any number of lightweight natural language models and any number of complex natural language models based on the number of applications available to digital assistant 900 or installed on electronic device 100. Thus, digital assistant 900 could include a third, fourth, fifth, sixth, or seventh, lightweight natural language model and complex natural language model. Similarly, digital assistant 900 can determine a third, fourth, fifth, sixth, or seventh natural language recognition score and a third, fourth, fifth, sixth, or seventh user intent associated with a third, fourth, fifth, sixth, or seventh application.

Figure 10:
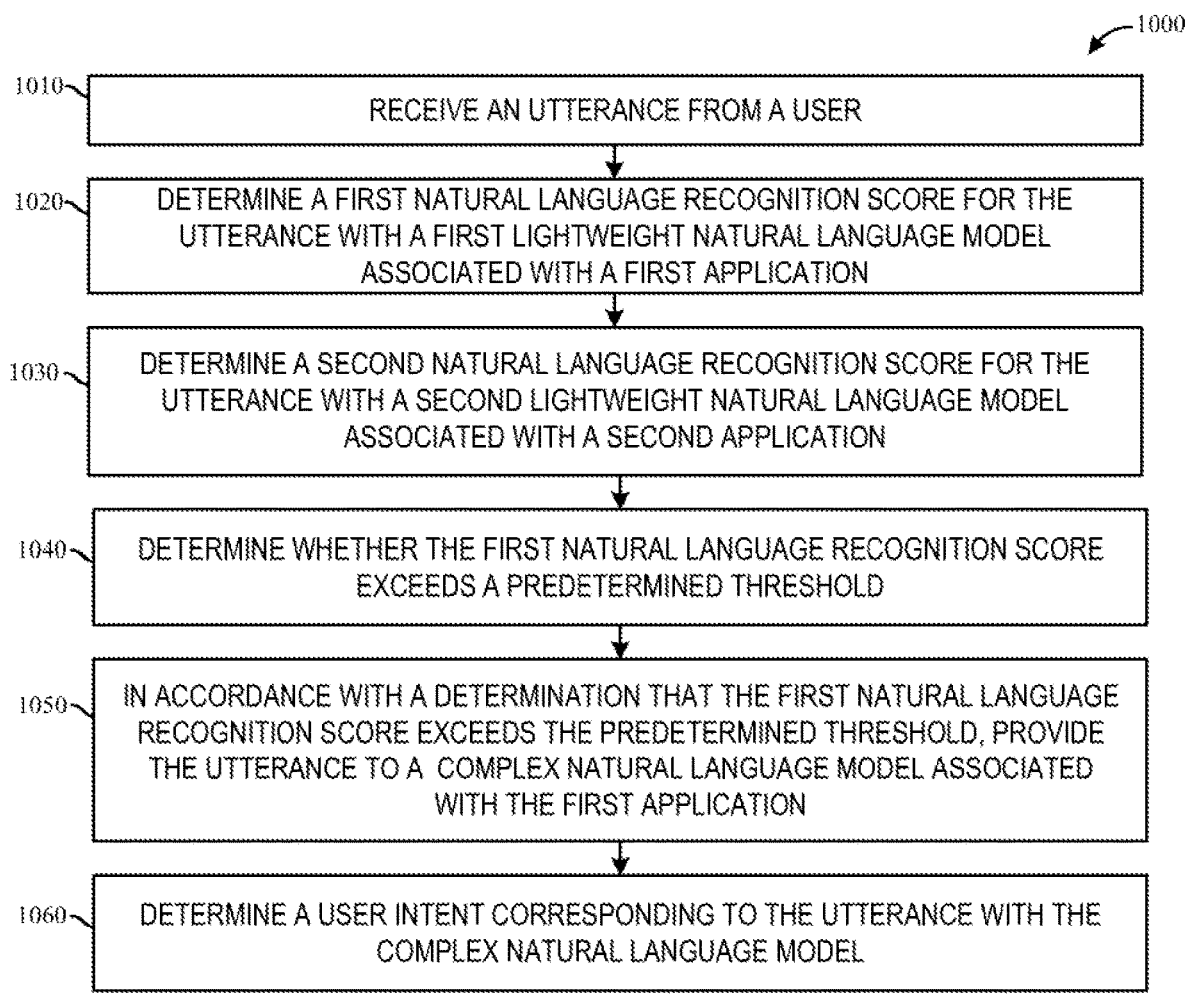
FIG. 10 is a flow diagram illustrating a process for performing natural language processing.

FIG. 10 is a flow diagram illustrating a process for determining a user intent, according to various examples. Process 1000 is performed at a device (e.g., device 100, 400, 500, 600) with one or more input devices (e.g., a touchscreen, a mic, a camera), and a wireless communication radio (e.g., a Bluetooth connection, WiFi connection, a mobile broadband connection such as a 4G LTE connection). In some embodiments, the electronic device includes a plurality of cameras. In some embodiments, the electronic device includes only one camera. In some examples, the device includes one or more biometric sensors which, optionally, include a camera, such as an infrared camera, a thermographic camera, or a combination thereof. Some operations in process 1000 are, optionally, combined, the orders of some operations are, optionally, changed, and some operations are, optionally, omitted.

In some examples, process 1000 is performed using a client-server system and the blocks of process 1000 are divided up in any manner between the server and a client device (e.g., device 100). In other examples, the blocks of process 1000 are divided up between the server and multiple client devices (e.g., a mobile phone and a smart watch). Thus, while portions of process 1000 are described herein as being performed by particular devices of a client-server system, it will be appreciated that process 1000 is not so limited. In other examples, process 1000 is performed using only a client device or only multiple client devices. In process 1000, some blocks are, optionally, combined, the order of some blocks is, optionally, changed, and some blocks are, optionally, omitted. In some examples, additional steps may be performed in combination with the process 1000.

At block 1010, an utterance (e.g., utterance 905) is received from a user. At block 1020, a first natural language recognition score (e.g., natural language recognition score 906, 907) for the utterance is determined with a first lightweight natural language model (e.g., lightweight natural language model 901, 902) associated with a first application. In some examples, determining the first natural language recognition score for the utterance with the first lightweight natural language model associated with the first application further comprises determining whether the utterance is relevant to the first application.

At block 1030, a second natural language recognition score (e.g., natural language recognition score 906, 907) for the utterance (e.g., utterance 905) is determined with a second lightweight natural language model (e.g., lightweight natural language model 901, 902) associated with a second application.

In some examples, prior to receiving the utterance (e.g., utterance 905) from the user, the first lightweight natural language model (e.g., lightweight natural language model 901, 902) is trained based on a first set of training data including a first plurality of utterances that are relevant to the first application and the second lightweight natural language model (e.g., lightweight natural language model 901, 902) is trained based on a second set of training data including a second plurality of utterances that are relevant to the second application. In some examples, training the first lightweight natural language model based on the first set of training data further comprises calibrating a third natural language recognition score based on a plurality of utterances of the first set of training data that are not relevant to the first application.

In some examples, the first lightweight natural language model (e.g., lightweight natural language model 901, 902) and the complex natural language model (e.g., complex natural language model 903, 904) associated with the first application are received from a second electronic device. In some examples, the first lightweight natural language model and the complex natural language model associated with the first application are trained simultaneously on the second electronic device.

At block 1040, whether the first natural language recognition score (e.g., natural language recognition score 906, 907) exceeds a predetermined threshold is determined.

At block 1050, in accordance with a determination that the first natural language recognition score (e.g., natural language recognition score 906, 907) exceeds the predetermined threshold, the utterance (e.g., utterance 905) is provided to a complex natural language model (e.g., complex natural language model 903, 904) associated with the first application. At block 1060, a user intent (e.g., user intent 908, 911) corresponding to the utterance is determined with the complex natural language model.

In some examples, the complex natural language model (e.g., complex natural language model 903, 904) associated with the first application is trained to determine the user intent (e.g., user intent 908, 911) and a task associated with the user intent and wherein the first lightweight natural language model (e.g., lightweight natural language model 901, 902) is not trained to determine the user intent. In some examples, the first lightweight natural language model is an abbreviated natural language model and the complex natural language model associated with the first application is a detailed natural language model.

In some examples, whether the first natural language recognition score (e.g., natural language recognition score 906, 907) is higher than the second natural language recognition score (e.g., natural language recognition score 906, 907) is determined. In accordance with a determination that the first natural language recognition score is higher than the second natural language recognition score, a task associated with the user intent (e.g., user intent 908, 911) is executed. In some examples, whether the second natural language recognition score is higher than the first natural language recognition score is determined. In accordance with a determination that the second natural language recognition score is higher than the first natural language recognition score, a task associated with the second user intent (e.g., user intent 908, 911) is executed.

In some examples, in accordance with a determination that the first natural language recognition score (e.g., natural language recognition score 906, 907) does not exceed the predetermined threshold whether the first application is active is determined. Further, in accordance with a determination that the first application is active the utterance (e.g., utterance 905) is provided to a complex natural language model (e.g., complex natural language model 903, 904) associated with a first application and a user intent (e.g., user intent 908, 911) corresponding to the utterance is determined with the complex natural language model.

In some examples, whether the second natural language recognition score (e.g., natural language recognition score 906, 907) exceeds the predetermined threshold is determined. In accordance with a determination that the second natural language recognition score exceeds the predetermined threshold the utterance (e.g., utterance 905) is provided to a complex natural language model (e.g., complex natural language model 903, 904) associated with the second application and a second user intent (e.g., user intent 908, 911) corresponding to the utterance is determined with the complex natural language model.

In some examples, a third natural language recognition score (e.g., natural language recognition score 906, 907) for the utterance (e.g., utterance 905) is determined with a third lightweight natural language model (e.g., lightweight natural language model 901, 902) associated with a third application, wherein the third application is available to the electronic device but not installed on the electronic device. In some examples, in accordance with a determination that the third natural language recognition score exceeds the predetermined threshold the third application is retrieved and installed on the electronic device (e.g., electronic device 100). In some examples, the third application is selected based on previous interaction with the third application. In some examples, the third application is selected based on the popularity of the third application.

In some examples, the first natural language recognition score (e.g., natural language recognition score 906, 907) is adjusted based on context data associated with the electronic device (e.g., electronic device 100). In some examples, the second natural language recognition score (e.g., natural language recognition score 906, 907) is adjusted based on a view of the electronic device.

Figure 11:
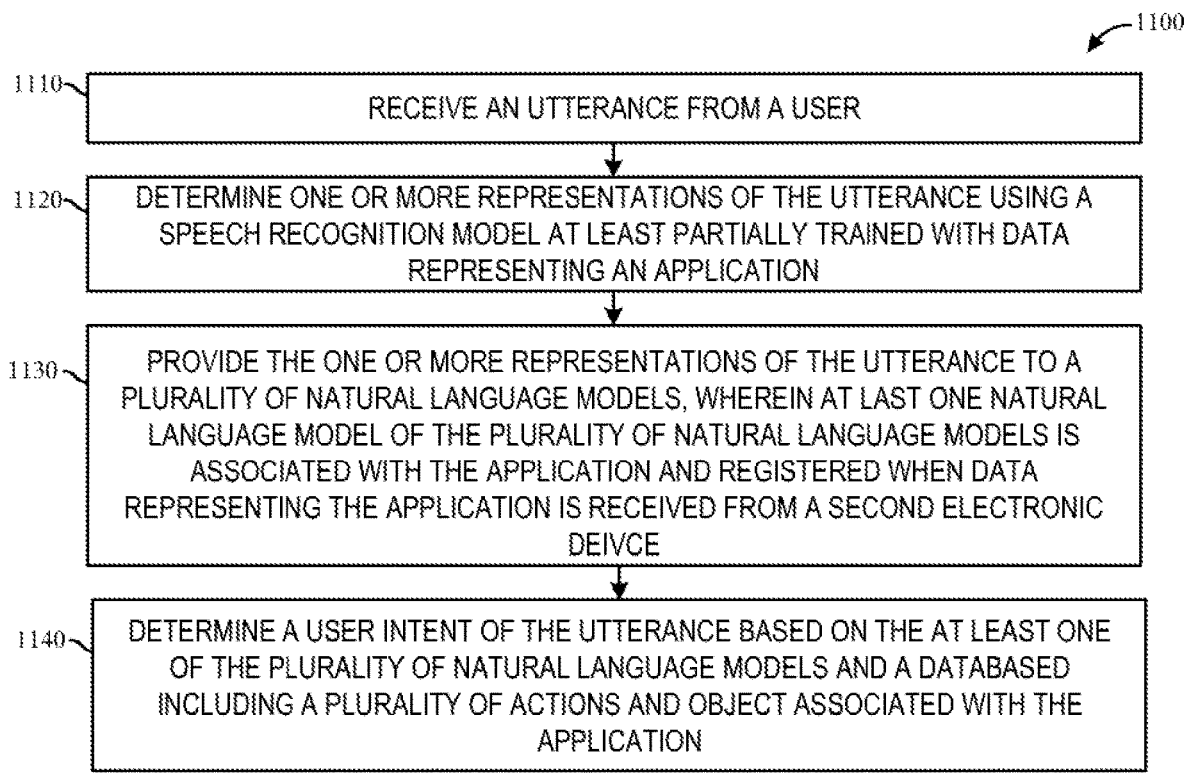
FIG. 11 is a flow diagram illustrating a process for determining and performing a task with an integrated application.

FIG. 11 illustrates a process 1100 for determining and performing a task with an integrated application. Process 1100 is performed at a device (e.g., device 100, 400, 500, 600, 1300, 1400) with one or more input devices (e.g., a touchscreen, a mic, a camera), and a wireless communication radio (e.g., a Bluetooth connection, WiFi connection, a mobile broadband connection such as a 4G LTE connection). In some embodiments, the electronic device includes a plurality of cameras. In some embodiments, the electronic device includes only one camera. In some examples, the device includes one or more biometric sensors which, optionally, include a camera, such as an infrared camera, a thermographic camera, or a combination thereof. Some operations in process 1100 are, optionally, combined, the orders of some operations are, optionally, changed, and some operations are, optionally, omitted.

In some examples, process 1100 is performed using a client-server system and the blocks of process 1100 are divided up in any manner between the server and a client device (e.g., device 100). In other examples, the blocks of process 1100 are divided up between the server and multiple client devices (e.g., a mobile phone and a smart watch). Thus, while portions of process 1200 are described herein as being performed by particular devices of a client-server system, it will be appreciated that process 1100 is not so limited. In other examples, process 1100 is performed using only a client device or only multiple client devices. In process 1100, some blocks are, optionally, combined, the order of some blocks is, optionally, changed, and some blocks are, optionally, omitted. In some examples, additional steps may be performed in combination with the process 1100.

At block 1110 an utterance (e.g., utterance 204, 404, 504, 604, 701, 905, 1205, 1304, 1404) is received from a user. In some examples, the utterance includes a request. For example, the utterance could be "what's the weather like?" as discussed above, "make that green," as discussed below, or any other utterance including various requests for a digital assistant (e.g., digital assistant 900, 1200). In some examples, the digital assistant determines whether the utterance includes a request.

In some examples, the utterance (e.g., utterance 204, 404, 504, 604, 701, 905, 1205, 1304, 1404) is received from the user during an active digital assistant session between the user and the digital assistant (e.g., digital assistant 201, 900, 1200). In some examples, the utterance is received from the user outside of an active digital assistant session between the user and the digital assistant. Accordingly, the digital assistant determines whether the utterance is intended for the digital assistant. In some examples, as discussed above, the digital assistant determines whether the utterance is intended for the digital assistant based on factors such as the view (e.g., view 700, 1301, 1401) of the electronic device (e.g., device 100, 400, 500, 600, 1300, 1400), the direction the user is facing, the volume of the utterance, a signal to noise ratio associated with the utterance, etc.

In some examples, the utterance (e.g., utterance 404, 504, 604, 701, 905, 1205, 1304, 1404) includes a trigger phrase. In some examples, the digital assistant (e.g., digital assistant 201, 900, 1200) determines whether the utterance includes a trigger phrase and launches a digital assistant session in accordance with a determination that the utterance includes the trigger phrase.

At block 1120 one or more representations of the utterance (e.g., utterance 404, 504, 604, 701, 905, 1205, 1304, 1404) are determined using a speech recognition model at least partially trained with data representing an application (e.g., application 405, 505, 605). In some examples the data representing an application is derived from source code for the application. When a developer of the application is creating the application the developer may include source code that specifies information on how the application can interact with other applications or a digital assistant. The data representing the application may be extracted from the source code upon creation of the application or upon installation of the application on an electronic device (e.g., device 100, 400, 500, 600, 1300, 1400).

Accordingly, the data representing the application (e.g., application 405, 505, 605) may be received from a second electronic device upon installation of the application. In some examples, the source code is transferred from the second electronic device to the first electronic device (e.g., device 100, 400, 500, 600, 1300, 1400) when the application is installed on the first electronic device. Accordingly, the first electronic device may extract the data from the source code after receipt of the source code. In some examples, the first electronic device is a user device like device 100. Further, in some examples, the second electronic device is a server communicatively coupled to the first electronic device.

In some examples, the source code for the application (e.g., application 405, 505, 605) includes at least one of models (e.g., model 901, 902, 903, 904) associated with the application, actions (e.g., action 306, sub-action 307) associated with the application, and objects (e.g., object 1225, 1235, word 1302, picture 1303, virtual chair 1402, virtual table 1403) associated with the application. In some examples, the models associated with the applications include the lightweight natural language models and complex natural language models discussed above with reference to FIGS. 9 and 10. Accordingly, upon installation of the application on the electronic device the lightweight natural language models and complex natural language models are extracted from the source code and installed on the electronic device and/or added to the digital assistant (e.g., digital assistant 201, 900, 1200).

In some examples, when the source code and/or the data representing the application (e.g., application 405, 505, 605) are received by the electronic device the actions (e.g., action 306, sub-action 307) associated with the application may be added to a database of possible actions as discussed above with reference to FIGS. 1-8. Similarly, when the source code and/or the data representing the application are received by the electronic device the objects (e.g., object 1225, 1235, word 1302, picture 1303, virtual chair 1402, virtual table 1403) associated with the application may be added to a database of actions and objects as discussed above with reference to FIGS. 1-8.

In some examples, the models (e.g., model 901, 902, 903, 904), actions (e.g., action 306, sub-action 307), and objects (e.g., object 1225, 1235, word 1302, picture 1303, virtual chair 1402, virtual table 1403) associated with the application (e.g., application 405, 505, 605) are capable of being interacted with by a digital assistant (e.g., digital assistant 201, 900, 1200). For example, the digital assistant may provide utterances to the natural language models and probe the natural language models as discussed with reference to FIGS. 9-10 and 12-15. Further, the digital assistant may search the actions and objects as discussed above with reference to FIGS. 1-8 to determine actions and objects of utterances. Accordingly, the models, actions, and objects associated with the application are integrated with the digital assistant.

In some examples, the speech recognition model is trained or retrained after receiving the data representing the application (e.g., application 405, 505, 605). For example, when the application is a rideshare application, the virtual assistant may receive data representing the rideshare application that includes vocabulary or terms associated with the rideshare application. Accordingly the digital assistant may retrain a speech recognition model of the digital assistant (e.g., digital assistant 201 900, 1200) with the vocabulary and terms associated with the rideshare application. In this way the digital assistant integrates the information from the rideshare application to understand when requests directed to the rideshare application are received. In some examples, the speech recognition model is trained or retrained when any application is installed and the data representing the respective application is received.

At block 1130 the one or more representations of the utterance are provided to a plurality of natural language models (e.g., model 901, 902, 903, 904). In some examples, at least one natural language model of the plurality of natural language modes is associated with the application (e.g., application 405, 505, 605) and registered with the digital assistant (e.g., digital assistant 201, 900, 1200) when the data representing the application is received from the second electronic device. Thus, as discussed above, the natural language models are received from a second electronic device like a server when the application is downloaded and/or installed on the electronic device of the user in some examples.

In some examples, at least one of the natural language models (e.g., model 901, 902, 903, 904) is previously trained at the second electronic device using training data determined based on the data representing the application (e.g., application 405, 505, 605) and data representing the digital assistant (e.g., digital assistant 201, 900, 1200). In some examples, the training data is a combination of data determined based on the source code of the application and data provided by the digital assistant. Accordingly, the natural language models are trained so that the digital assistant can adequately interact with the natural language models when the application is installed on the electronic device. In some examples, the natural language models are neural networks or machine learning models and are trained as described above with reference to FIGS. 9 and 10.

In some examples, the training data includes application (e.g., application 405, 505, 605) specific vocabulary, a translation of an application specific term, or an example text to be provided by the digital assistant (e.g., digital assistant 201, 900, 1200) as an output. In particular, the training data may be data associated with the application provided by the developer of the application with the source data representing the application. Accordingly, the developer may provide specific vocabulary, translations, or other data that a digital assistant would not normally be trained to recognize. In this way, the application specific vocabularies, translations, and example text may be integrated with the digital assistant through the trained natural language models. For example, for a rideshare application the training data may include models of cars, makes of cars, locations, or other vocabulary or text that are required for the rideshare application to correctly function and interact with a digital assistant.

In some examples, when the natural language model (e.g., model 901, 902, 903, 904) is received from a second electronic device the natural language model is registered with the digital assistant (e.g., digital assistant 201, 900, 1200). In some examples, registering the natural language model with the digital assistant is part of the process of registering the application (e.g., application 405, 505, 605) with the digital assistant. In some examples, registering the natural language model with the digital assistant includes integrating the natural language model with the digital assistant. In some examples, registering the natural language model further comprises receiving a lightweight natural language model (e.g., the lightweight natural language models discussed above with reference to FIGS. 9 and 10) associated with the application. Further, registering the natural language model also comprises adding the application to a list of applications installed on the electronic device.

In some examples, registering the at least one natural language model (e.g., model 901, 902, 903, 904) further comprises receiving a complex natural language model (e.g., the complex natural language models discussed above with reference to FIGS. 9 and 10) associated with the application (e.g., application 405, 505, 605) and integrating the complex natural language model associated with the application with a natural language model associated with the digital assistant (e.g., digital assistant 201, 900, 1200). In some examples, integrating the complex natural language model for the application with the natural language model associated with the digital assistant includes retraining the natural language model associated with the digital assistant.

In some examples, integrating the complex natural language model for the application (e.g., application 405, 505, 605) with the natural language model associated with the digital assistant (e.g., digital assistant 201, 900, 1200) includes the digital assistant probing the complex natural language model for the application. For example, when digital assistant 1200 receives a complex natural language model associated with a rideshare application, digital assistant 1200 may probe the complex natural language model to learn how to interact with the rideshare application. Accordingly, the digital assistant can determine the capabilities of the application and how to interact with the natural language model for the application.

In some examples, providing the one or more representations of the utterance to a plurality of natural language models further comprises determining a natural language recognition score (e.g., natural language recognition score 906, 907) for the one or more representations of the utterance using the lightweight natural language model and determining whether the natural language recognition score exceeds a predetermined threshold as discussed above with reference to FIGS. 9 and 10. In some examples, in accordance with a determination that the natural language recognition score exceeds the predetermined threshold the complex natural language model associated with the application is received. Accordingly, after the complex natural language model associated with the application is received, the one or more representation of the utterance are provided to the complex natural language model.

At block 1140, a user intent of the utterance is determined based on the at least one of the plurality of natural language models and a database including a plurality of actions (e.g., action 306, sub-action 307) and objects (e.g., object 1225, 1235, word 1302, picture 1303, virtual chair 1402, virtual table 1403) associated with the application (e.g., application 405, 505, 605). In some examples, the user intent of the utterance is determined by performing natural language processing with at least one of the plurality of natural language models. In some examples, the user intent is determined by determining an action of the database corresponding to the user intent and determining an object of the database corresponding to the user intent, as described above with reference to FIGS. 1-8. Further, after determining the user intent a task based on the action and the object is performed as described above with reference to FIGS. 1-8.

Figure 12:
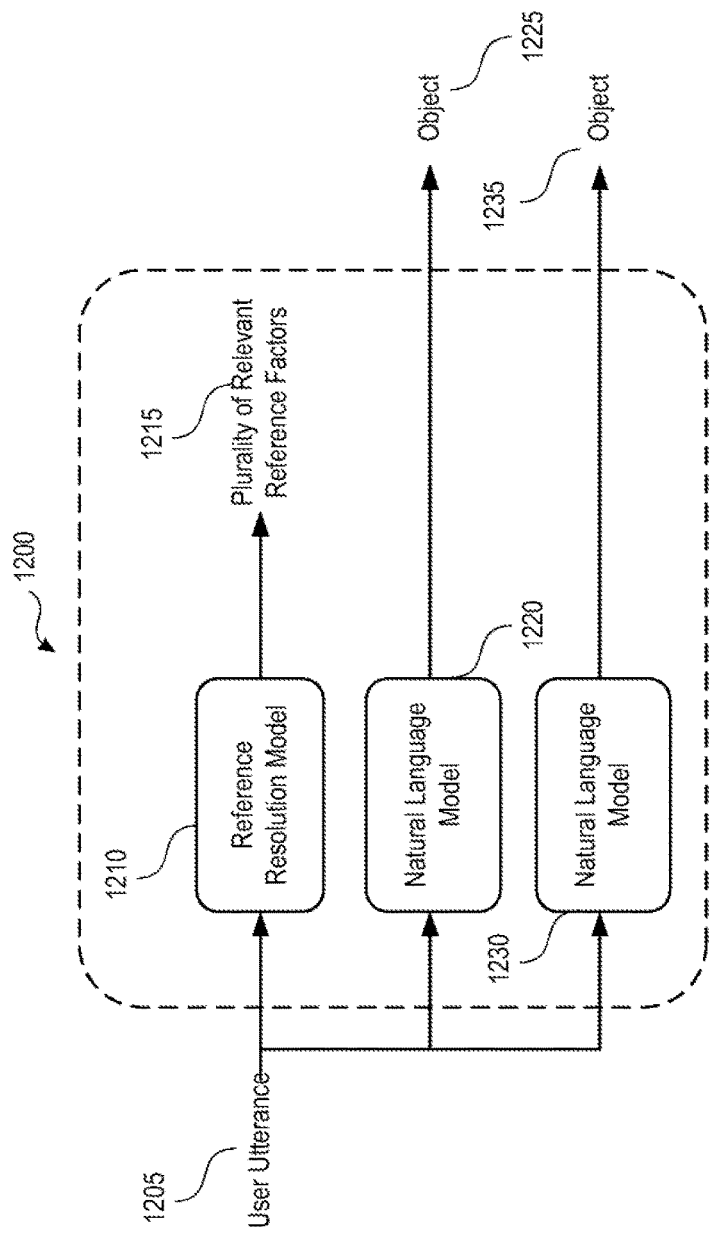
FIG. 12 depicts an exemplary digital assistant for resolving an ambiguous term of a user utterance.

FIG. 12 illustrates an exemplary digital assistant 1200 for resolving a reference of a user utterance. As shown in FIG. 12, digital assistant 1200 includes reference resolution model 1210 and natural language models 1220 and 1230. In some examples, digital assistant 1200 is implemented on an electronic device (e.g., electronic device 100, 1300, 1400). In some examples, digital assistant 1200 is implemented across other devices (e.g., a server) in addition to the electronic device. In some examples, some of the modules and functions of digital assistant 1200 are divided into a server portion and a client portion, where the client portion resides on one or more user devices (e.g., electronic device 100, 1300, 1400) and communicates with the server portion through one or more networks. It should be noted that digital assistant 1200 is only one example and that digital assistant 1200 can have more or fewer components than shown, can combine two or more components, or can have a different configuration or arrangement of the components. The various components of digital assistant 1200 are implemented in hardware, software instructions for execution by one or more processors, firmware, including one or more signal processing and/or application specific integrated circuits, or a combination thereof.

Digital assistant 1200 receives user utterance 1205 and determines object 1235 that an ambiguous term of user utterance 1205 references. As discussed further below, digital assistant 1200 determines whether user utterance 1205 includes an ambiguous term. If user utterance 1205 includes an ambiguous term then digital assistant 1200 provides user utterance 1205 to reference resolution model 1210. Reference resolution model 1210 determines the plurality of relevance factors 1215. Digital assistant 1200 then determines a relevant application based on relevance factors 1215 and determines object 1235 that the ambiguous term of user utterance 1205 references based on the relevant application.

Figure 13:
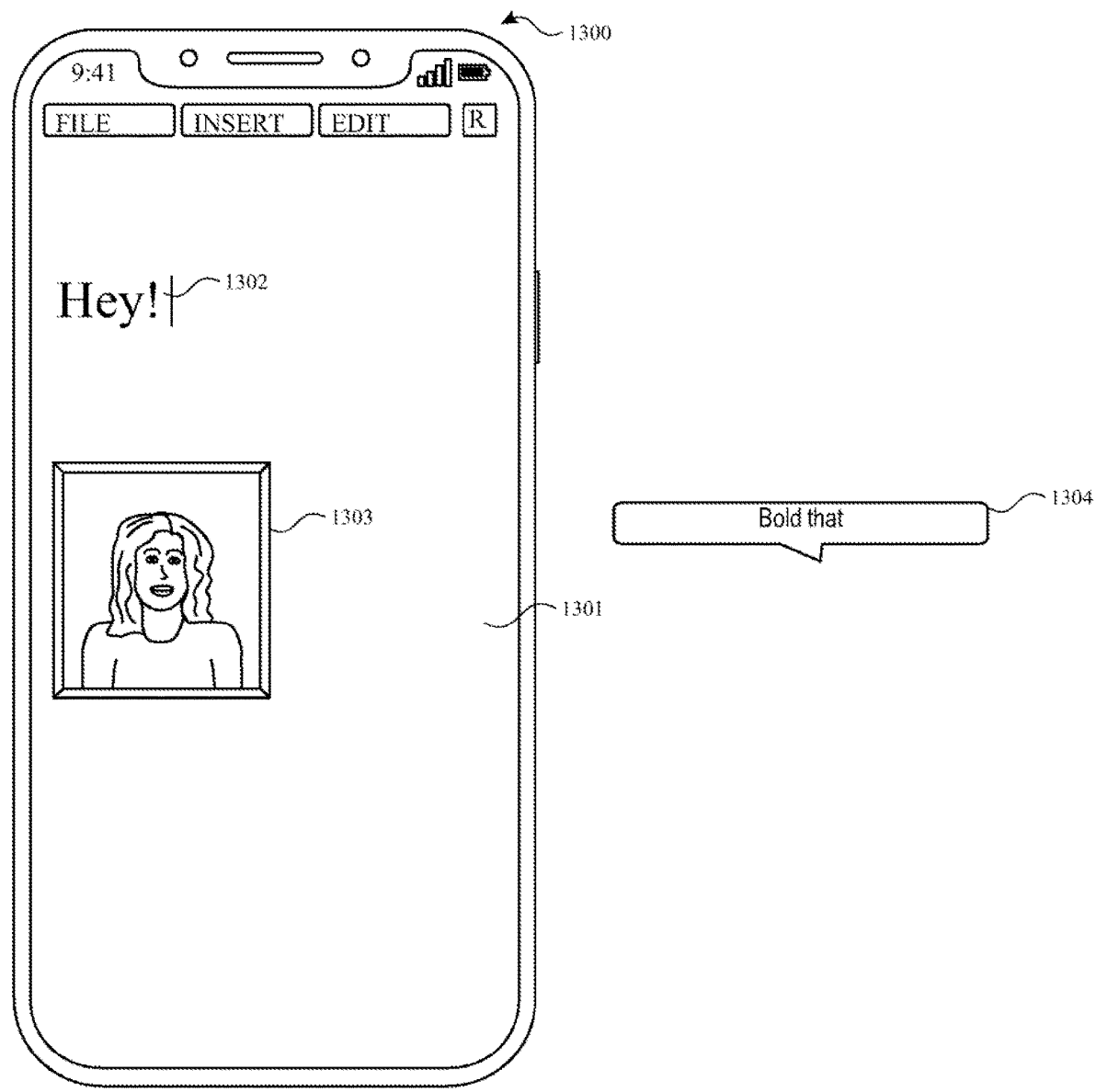
FIG. 13 depicts example views of an electronic device for use with the reference resolution process.
Figure 14:
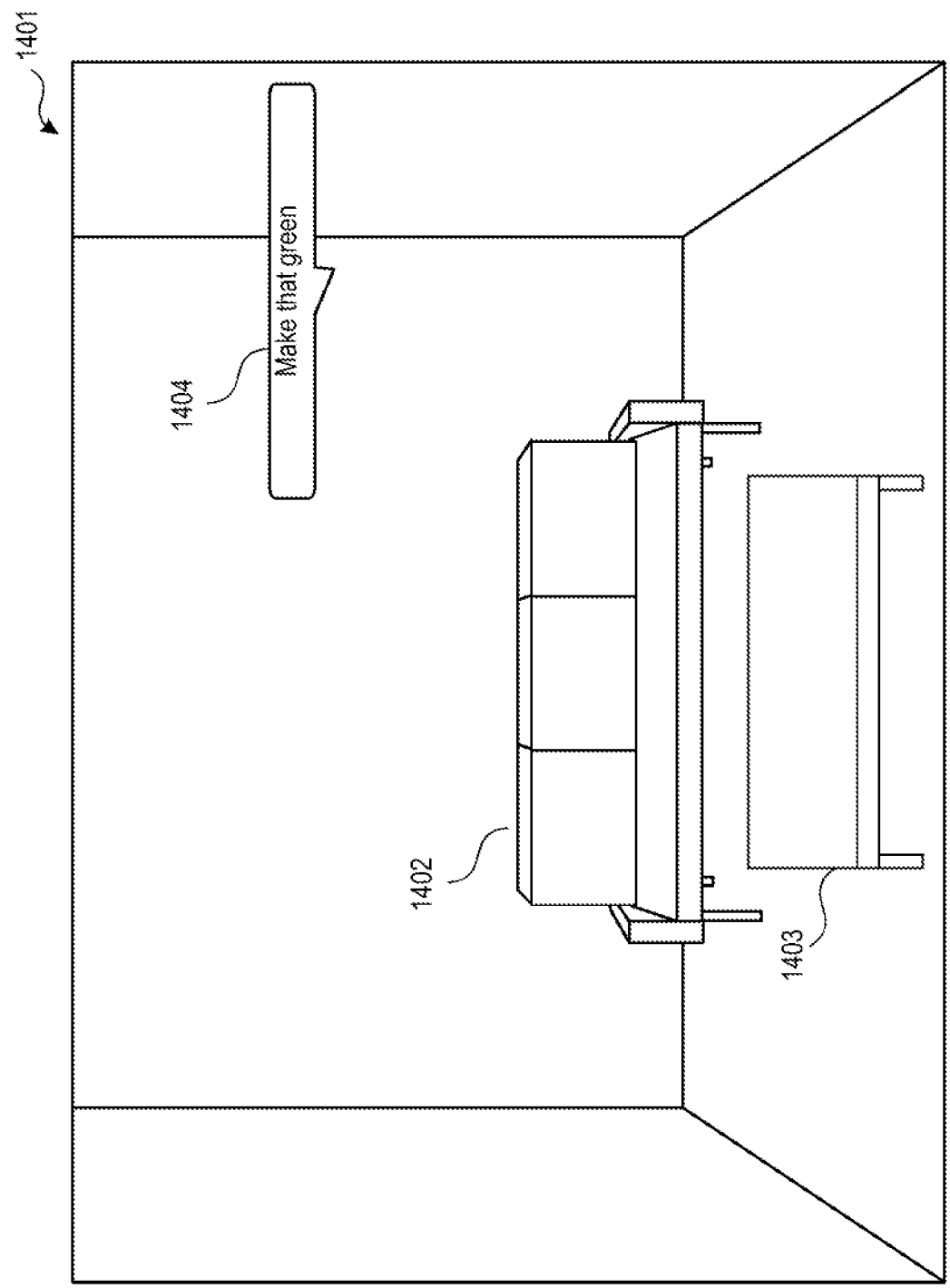
FIG. 14 depicts example views of an electronic device for use with the reference resolution process.

FIGS. 13 and 14 depict example views of an electronic device for use with the reference resolution process, according to various examples. FIG. 13 illustrates electronic device 1300 displaying view 1301 including word 1302 and picture 1303 on a screen of electronic device 1300 and user utterance 1304 received by electronic device 1300. FIG. 14 illustrates view 1401 of electronic device 1400 including virtual chair 1402 and virtual table 1403 and user utterance 1404 received by electronic device 1400. Each of FIGS. 13 and 14 will be discussed alongside process 1200 of FIG. 12 for resolving a reference of a user utterance.

In some examples, utterance 1205 is received from the user during an active digital assistant session between the user and digital assistant 1200. In some examples, utterance 1205 is received from the user outside of an active digital assistant session between the user and digital assistant 1200. Accordingly, digital assistant 1200 determines whether utterance 1205 is intended for digital assistant 12000. In some examples, as discussed above, digital assistant 1200 determines whether utterance 1205 is intended for digital assistant 1200 based on factors such as the view of the electronic device, the direction the user is facing, the volume of utterance 1205, a signal to noise ratio associated with utterance 1205, etc.

In some examples, utterance 1205 includes a trigger phrase. In some examples, digital assistant 1200 determines whether utterance 1205 includes a trigger phrase and launches a digital assistant session in accordance with a determination that utterance 1205 includes the trigger phrase.

In some examples, user utterance 1205 includes a request. In some examples, digital assistant 1200 determines whether user utterance 1205 includes a request. In some examples, digital assistant 1200 performs automatic speech recognition and/or natural language processing on user utterance 1205 to determine whether user utterance 1205 includes a request. Further when user utterance 1205 includes a request, digital assistant 1200 performs automatic speech recognition and/or natural language processing on user utterance 1205 to determine the request of user utterance 1205.

In particular, digital assistant 1200 can include one or more ASR systems that process user utterance 1205 received through input devices (e.g., a microphone) of electronic device 100. The ASR systems extract representative features from the speech input. For example, the ASR systems pre-processor performs a Fourier transform on user utterance 1205 to extract spectral features that characterize the speech input as a sequence of representative multi-dimensional vectors.

Further, each ASR system of digital assistant 1200 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens).

In some examples, digital assistant 1200 determines whether the request of user utterance 1205 includes an ambiguous term. In some examples, the ambiguous term is a deictic reference. A deictic reference is a word or phrase that ambiguously references something like an object, time, person, or place. Exemplary deictic references include but are not limited to that, this, here, there, then, those, them, he, she, etc. particularly when used with a question such as the questions "what is this?," "where is that?," and "who is he?" Accordingly, digital assistant 1200 determines whether the request includes one of these words or words like them and thus, whether the use of the word is ambiguous. For example, in user utterance 1304 "bold that" digital assistant 1200 may determine that "that" is a deictic reference through ASR and/or NLP. Similarly, in spoken input 1404 "make that green" digital assistant 1200 determines that "that" is a deictic reference. In both examples, digital assistant 1200 may determine "that" to be ambiguous because the user input does not include a subject or object that could be referred to with "that" or "this."

In accordance with digital assistant 1200 determining that the request of user utterance 1205 includes an ambiguous term, digital assistant 1200 provides user utterance 1205 to reference resolution model 1210. For example, when digital assistant 1200 determines that "that" in user utterance 1304 "bold that" is a deictic reference and thus is ambiguous, digital assistant 1200 provides user utterance 1304 to reference resolution model 1210.

In some examples, reference resolution model 1210 is a neural network, machine learning model, or similar processing structure. In some examples, reference resolution model 1210 is trained to determine one or more relevant reference factors as described further below before user utterance 1205 is received. In some examples, reference resolution model 1210 is trained on an electronic device separate from the electronic device that receives user utterance 1205. In some examples, reference resolution model 1210 is received at electronic device 100 from another electronic device after training has been completed.

Reference resolution model 1210 then determines plurality of relevant reference factors 1215. In some examples, reference resolution model 1210 determines plurality of relevant reference factors 1215 based on user utterance 1205. For example, when reference resolution model 1210 receives user utterance 1304 of "bold that," reference resolution model 1210 may select reference factors that are relevant to the use of "bold" in user utterance 1304. As another example, when reference resolution model 1210 receives user utterance 1304 of "bold that," reference resolution model 1210 may select reference factors that will be helpful to resolve the reference "that," as opposed to a reference of "him" or "them."

In some examples, reference resolution model 1210 determines plurality of relevant reference factors 1215 based on context information of the electronic device (e.g., electronic device 1300, 1400). Context data associated with the electronic device includes various characteristics of the electronic device. For instance, context data may indicate a location of the electronic device (e.g., GPS coordinates), whether the electronic device is connected to a network (e.g., WiFi network), whether the electronic device is connected to one or more other devices (e.g., headphones), and/or a current time, date, and/or weekday. If the electronic device is connected to a network or device, the context data may further indicate a name and/or type of the network or device, respectively.

As example, when user utterance 1404 of "make that green," is received digital assistant 1200 may determine the location of electronic device 1400 to determine whether user utterance 1404 may be referencing an object near by the user in the real world. Accordingly, digital assistant 1200 may determine that the user is located in their home and thus is not located near any important or noteworthy objects. Thus, digital assistant 1200 may use this information as a relevant reference factor to help determine that the user is likely referencing one of the virtual objects within view 1401.

In some examples, reference resolution model 1210 determines plurality of relevant reference factors 1215 based on default settings of the electronic device (e.g., electronic device 1300, 1400) or digital assistant 1200. In some examples, the default settings of the electronic device or digital assistant 1200 are associated with a particular user. For example, the user providing user utterance 1205 may have designated a specific ride share application as a default ride share application. Accordingly, when reference resolution model 1210 receives an utterance "get me a ride there," reference resolution model 1210 may determine that the relevant factors include the default rideshare application and parameters associated with the default rideshare application.

In some examples, reference resolution model 1210 determines plurality of relevant reference factors 1215 based on historical interaction of the user with the electronic device (e.g., electronic device 1300, 1400) or digital assistant 1200. In some examples, digital assistant 1200 may monitor interactions between the user and digital assistant 1200 and determine relevant reference factors based on these interactions. In some examples, digital assistant 1200 may access the transcript discussed above to determine reference factors that may be relevant. For example, when user utterance 1404 "make that green," is received by reference resolution model 1210, reference resolution model 1210 may access the transcript to determine reference factors that may be relevant to the color green, such as actions that have been taken previously with other colors.

In some examples, the plurality of relevant reference factors 1215 includes a view of the electronic device. For example, when user utterance 1404 "make that green," is received by digital assistant 1200 while electronic device 1400 is providing view 1401, reference resolution model 1210 may determine that view 1401 is a relevant reference factor because user utterance 1404 may be related to the virtual reality view and items being displayed by device 1400.

In some examples, digital assistant 1200 determines whether a view of electronic device includes an object and if the view of the electronic device includes an object, reference resolution model 1210 includes the object as a relevant reference factor of the plurality of relevant reference factors 1215. For example, as discussed above, view 1401 may include virtual chair 1402 and virtual table 1403. Accordingly, because view 1401 of electronic device 1400 includes these virtual objects, reference resolution model 1210 may determine that virtual chair 1402 and virtual table 1403 are relevant reference factors.

In some examples, the plurality of relevant reference factors 1215 includes an ontology of an application installed on the electronic device. For example, reference resolution model 1210 may retrieve ontologies of all applications installed on the electronic device. As another example, reference resolution model 1210 may determine a specific application (or multiple applications) that are relevant to user utterance 1205 as discussed above and thus retrieve the ontologies of these specific applications and add them to plurality of relevant reference factors 1215.

In some examples, the plurality of relevant reference factors 1215 includes actions and metadata associated with an application installed on the electronic device. For example, when reference resolution model 1210 determines one or more applications that may be relevant to user utterance 1205, reference resolution model 1210 may retrieve or determine actions or metadata of the application as discussed above with reference to FIGS. 1-7 as a relevant reference factor. Further, reference resolution model 1210 may retrieve or determine actions or metadata of applications from a transcript of previously performed actions as discussed above.

In some examples, the plurality of relevant reference factors 1215 includes applications that are open on the electronic device. For example, when reference resolution model 1210 receives user utterance 1304 "bold that," or other user utterances, reference resolution model 1210 may determine that an open application on electronic device 1300 is a relevant reference factor. In some examples, the plurality of relevant reference factors 1215 includes applications that are the focus (e.g., being displayed) on the electronic device.

In some examples, the plurality of relevant reference factors 1215 includes preferences associated with a user of the electronic device. In some examples, reference resolution model 1210 determines preferences associated with the user that provides user utterance 1205 for one or more of the applications installed on the electronic device. For example, when reference resolution model 1210 receives user utterance 1404 "make that green," reference resolution model 1210 may determine that a preference the user has for creating virtual objects with a specific application is a relevant reference factor.

In some examples, the plurality of relevant reference factors 1215 includes a gaze of a user of the electronic device. In some examples, digital assistant 1200 determines where the user is looking in a view of the electronic device and determine whether the user is looking at an application or an object associated with an application. For example, when user utterance 1304 "bold that" is received digital assistant 1200 may determine that the user is looking at the word processing application open on view 1301 of electronic device 1300. Accordingly, digital assistant 1200 may include this gaze as a relevant reference factor.

In some examples, the plurality of relevant reference factors 1215 includes a natural language recognition score for user utterance 1205. In some examples the natural language recognition score is determined as discussed above with reference to FIGS. 9 and 10.

In some examples, reference resolution model 1210 determines plurality of relevant reference factors 1215 by selecting the plurality of relevant reference factors 1215 from a plurality of reference factors. Thus, reference resolution model 1210 may select one or more of the relevant reference factors discussed above from a list of reference factors that are available to digital assistant 1200 based on the relevance of each of the factors as discussed in the various examples above.

After determining the plurality of relevant reference factors 1215, reference resolution model 1210 provides the plurality of relevant reference factors 1215 to digital assistant 1200. Digital assistant 1200 then determines a relevant application based on the plurality of relevant reference factors 1215. In some examples, digital assistant 1200 determines the relevant application based on the plurality of relevant reference factors with reference resolution model 1210. Thus, in some examples, reference resolution model 1210 provides the relevant application to digital assistant 1200 in addition to the plurality of relevant reference factors 1215.

In some examples, digital assistant 1200 determines the relevant application based on the application being included in the plurality of relevant reference factors 1215. For example, when user utterance 1304 "bold that" is received while a word processing application is open and the focus of electronic device 1300, the word processing application is included in the plurality of relevant reference factors 1215. Accordingly, because the word processing application is included in the plurality of relevant reference factors 1215, digital assistant 1200 may determine that the word processing application is the relevant application.

In some examples, digital assistant 1200 determines the relevant application based on a property of an ontology of the application being included in the plurality of relevant reference factors 1215. For example, when user utterance 1404 "make that green" is received, the property of color of an ontology associated with an application for making virtual furniture may be identified as a relevant reference factor. Accordingly, digital assistant 1200 may determine that the application for making virtual chair 1402 and virtual table 1403 is the relevant application because of the color property of the ontology.

In some examples, digital assistant 1200 determines the relevant application based on a preference of the user for the application being included in the plurality of relevant reference factors 1215. For example, when the user utterance "get me a car," is received, the preference of the user to use a specific ride share application or order a specific type of car in a rideshare application may be determined as a relevant reference factor. Accordingly, digital assistant 1200 may determine the rideshare application preferred by the user or which can order the type of car the user prefers as the relevant application.

In some examples, digital assistant 1200 determines the relevant application by selecting an application associated with a majority of the plurality of relevant reference factors 1215. For example, when user utterance 1404 "make that green," is received, the property of color of an ontology associated with an application for making virtual furniture may be identified as a relevant reference factor. Further, the application for making virtual furniture may also be open on electronic device 1400 and virtual chair 1402 created by the application may be the focus of view 1401. Accordingly, digital assistant 1200 may recognize that several of the plurality of relevant reference factors are all associated with the application for making virtual furniture and thus, may select that application as the relevant application.

In some examples, digital assistant 1200 determines the relevant application by applying a weight to each of the relevant reference factors of the plurality of relevant reference factors 1215. For example, different weights may be applied to applications that are open on the electronic device, ontologies of the applications installed on the electronic device, a view of the electronic device, etc. In some examples, some of the relevant reference factors are weighted more heavily than other relevant reference factors. For example, when user utterance 1304 "bold that" is received, the reference factor indicating that the word processing application is open may be weighted more heavily than the reference factor indicating that view 1301 includes picture 1303.

Further, digital assistant 1200 determines the relevant application by determining an application corresponding to the relevant reference factor with the highest weight. Thus, continuing the example discussed above, when user utterance 1304 "bold that" is received and the reference factor indicating that the word processing application is open is assigned a relatively high weight, digital assistant 1200 determines that the word processing application is the relevant application. Digital assistant 1200 determines that the word processing application is the relevant application even when reference factors associated with other application are also assigned weights, provided that the reference factors associated with the word processing application have been assigned the highest weight.

In some examples, digital assistant 1200 determines the relevant application by selecting an application associated with relevant reference factors having a weight that exceeds a predetermined threshold. For example, when user utterance 1304 "bold that" is received and the reference factor indicating that the word processing application is open is assigned a weight, digital assistant 1200 may determine whether the weight associated with the reference factor exceeds a predetermined threshold. In accordance with a determination that the reference factor exceeds the predetermined threshold then digital assistant 1200 may determine that the word processing application is the relevant application.

In some examples, digital assistant 1200 determines the relevant application by determining whether a natural language recognition score for user utterance 1205 exceeds a predetermined threshold. In particular, digital assistant 1200 may determine the natural language recognition score for user utterance 1205 as discussed above with reference to FIGS. 9 and 10. In particular, a lightweight natural language model associated with an application may determine the natural language recognition score for user utterance 1205. Similarly, digital assistant 1200 may determine whether the natural language recognition score for user utterance 1205 exceeds a predetermined threshold and if it does, select the application associated with the lightweight natural language model as the relevant application.

It will be appreciated that digital assistant 1200 may determine the relevant application by combining any of the processes and factors described above to determine which application (or applications as discussed below) should be selected as the relevant application for further processing.

In some examples, digital assistant 1200 determines multiple relevant applications based on the plurality of relevant reference factors 1215. For example, digital assistant 1200 may determine that several reference factors associated with different applications exceed the predetermined threshold. Thus, digital assistant 1200 may determine that each of the different applications is a relevant application. Accordingly, digital assistant 1200 may select all of the different applications as relevant applications and use them to determine an object that the ambiguous term of the request references, as discussed below.

After determining the relevant application(s), digital assistant 1200 determines object 1225 that the ambiguous term of the request references based on the relevant application(s). In some examples, digital assistant 1200 determines object 1225 that the ambiguous term of the request references based on the relevant application by accessing natural language model 1220 associated with the relevant application. In some examples, natural language model 1220 and natural language model 1230 are complex natural language models as described above with reference to FIGS. 9-10. In some examples, digital assistant 1200 accesses natural language model 1230 associated with a second relevant application to determine object 1235 that the ambiguous term of the request references.

In some examples, digital assistant 1200 determines object 1225 that the ambiguous term of the request references using reference resolution model 1210. Accordingly, reference resolution model 1210 has access to the various natural language models associated with application to determine object 1225. In this way, all of the processing to determine object 1225 including determining the plurality of relevant reference factors 1215, determining one or more relevant applications, and determining object 1225 can be performed with reference resolution model 1210 which has been integrated with digital assistant 1200.

In some examples, accessing natural language model 1220 associated with the relevant application includes determining whether a portion of natural language model 1220 includes an object present in a view of the electronic device. For example, when user utterance 1304 "bold that" is received, digital assistant 1200 may access natural language model 1220 associated with the word processing application. Digital assistant 1200 may then determine whether natural language model 1220 (or a portion of natural language model 1220) includes either a word or a picture because view 1301 includes word 1302 and picture 1303. Accordingly, digital assistant 1200 may determine that natural language model 1220 includes an object that is a word and thus determines that object 1225 is word 1302.

As another example, when user utterance 1401 "make that green" is received, digital assistant 1200 may access natural language model 1230 associated with application for making virtual furniture. Digital assistant 1200 may then determine whether natural language model 1230 (or a portion of natural language model 1230) includes either a chair or a desk because view 1401 includes virtual chair 1402 and virtual table 1403. Accordingly, digital assistant 1200 may determine that natural language model 1230 includes an object that is a virtual chair and thus determines that object 1235 is virtual chair 1402.

In some examples, accessing natural language model 1220 associated with the relevant application includes determining whether an object of natural language model 1220 includes a property related to a term of the user utterance. For example, when user utterance 1304 "bold that" is received, digital assistant 1200 may access natural language model 1220 associated with the word processing application. Digital assistant 1200 may then determine if any objects of natural language model 1220 have a property of "bold." Accordingly, digital assistant 1200 determines that the word object of natural language model 1220 has a property of bold and thus object 1225 is word 1302. Similarly, digital assistant 1200 determines that the picture object of natural language model 1220 does not have a property of bold and thus object 1225 is not picture 1303.

As another example, when user utterance 1401 "make that green" is received, digital assistant 1200 may access natural language model 1230 associated with application for making virtual furniture. Digital assistant 1200 may then determine if any objects of natural language model 1230 have a property of "color," because user utterance 1401 includes a color. Accordingly, digital assistant 1200 determines that the chair object of natural language model 1230 has a color property and thus object 1235 is virtual chair 1402. Similarly, digital assistant 1200 determines that the table object of natural language model 1230 does not have a color property and thus object 1235 is not virtual table 1403.

In some examples, digital assistant 1200 determines multiple possible objects 1225 that the ambiguous term of the request references based on the relevant application. For example, there may be several word objects of natural language model 1220 and thus digital assistant 1200 may determine each of the word objects that satisfy the requirements could be the object being referenced by the request of user utterance 1205 as discussed above.

In some examples, digital assistant 1200 receives a first user intent associated with the relevant application from natural language model 1220 and determines a first user intent score based on object 1225 and the received first user intent. For example, when user utterance 1304 "bold that" is received digital assistant 1200 may receive the user intent of bolding word 1302 from natural language model 1220 associated with the word processing application. Accordingly, because user utterance 1304 and the received user intent are similar digital assistant 1200 may determine a relatively high user intent score. In some examples, natural language model 1220 determines the user intent associated with the application as discussed above with reference to FIGS. 9 and 10.

Similarly, in some examples, digital assistant 1200 receives a second user intent associated with the relevant application from natural language model 1230 and determines a second user intent score based on object 1235 and the received second user intent. For example, when user utterance 1304 "bold that" is received digital assistant 1200 may receive the user intent of creating bold virtual furniture from natural language model 1230 associated with the application for making virtual furniture. Accordingly, because user utterance 1304 and the received user intent are not similar, digital assistant 1200 may determine a relatively low user intent score.

Digital assistant 1200 then determines whether the first user intent score or the second user intent score is higher. In accordance with a determination that the first user intent score is higher than the second user intent score, digital assistant 1200 causes the relevant application associated with the first user intent score to execute a first task associated with the first user intent on object 1225. Continuing the previous example, digital assistant 1200 compares the first user intent score associated with word processing application and the second user intent score associated with the application for making virtual furniture and determines that the first user intent score is higher. Accordingly, digital assistant 1200 causes the word processing application to bold word 1302 according with the first user intent.

Similarly, in accordance with a determination that the second user intent score is higher than the first user intent score, digital assistant 1200 causes the relevant application associated with the second user intent score to execute a second task associated with the second user intent on object 1235. For example, when user utterance 1404 of "make that green," is received, digital assistant 1200 may receive the first user intent of making word 1302 green associated with the word processing application and determines the first user intent score. Digital assistant 1200 also receives the second user intent of making virtual chair 1402 green associated with the virtual furniture application and determines the second user intent score. In this example, the first user intent score may not be low or high, indicating that the first user intent may be related to user utterance 1404. However, the second user intent score may be relatively high because user utterance 1404 is received as part of a conversation about virtual chair 1402. Thus, digital assistant 1200 may compare the second user intent and the first user intent and determine that the second user intent is higher. Accordingly, digital assistant 1200 may cause the virtual furniture application to change the color of virtual chair 1402 to green.

In some examples, digital assistant 1200 determines whether the first task is not executed and in accordance with a determination that the first task is not executed, digital assistant 1200 provides an output indicating the first task was not executed including a prompt. For example, digital assistant 1200 may determine that the task is to bold picture 1303 and then determine that the task is not executed because picture 1303 cannot be bolded. Accordingly, digital assistant 1200 provides the output "The picture cannot be bolded, please specify which object to bold."

In some examples the output is a spoken output. For example, digital assistant 1200 may provide the output "The picture cannot be bolded, please specify which object to bold," as an audio output from a speaker of electronic device 1300. In some examples the output is an output on a display of the electronic device. For example, digital assistant 1200 may provide the output "The picture cannot be bolded, please specify which object to bold," on a touch sensitive screen of electronic device 1300. As another example, when the electronic device is a virtual reality device, digital assistant 1200 may project "The picture cannot be bolded, please specify which object to bold," as virtual text.

In some examples, digital assistant 1200 receives a response to the prompt. In some examples, the response to the prompt is a spoken input. For example, digital assistant 1200 may receive the spoken input "bold the word," from a user. In some examples, the response to the prompt is an input on a touch sensitive display of the electronic device. For example, the user may select the word that they would like to bolded providing the indication to digital assistant 1200.

In response to receiving the response to the prompt, digital assistant 1200 causes the relevant application to execute the first task using the input received in response to the prompt. For example, after receiving the spoken input "bold the word," from a user digital assistant causes the word processing application to perform the task of bolding on word 1302 based on the user input.

In some examples, in accordance with determining that the first task is not executed, digital assistant 1200 causes the second relevant application to execute the second task associated with the second user intent. For example, when digital assistant 1200 determines that the task of bolding picture 1303 is not executed, digital assistant 1200 causes the virtual furniture application to execute a task of creating bold furniture.

In some examples, digital assistant 1200 determines whether the second task is not executed and in accordance with a determination that the second task is not executed digital assistant 1200 provides an output indicating an error. For example, digital assistant 1200 may determine that the task of creating bold furniture also cannot be executed and therefore may provide the output of "Sony, I can't do that right now." In some examples the output indicating an error is a spoken output. In some examples, the output indicating the error is an output on a display of the electronic device.

Figure 15:
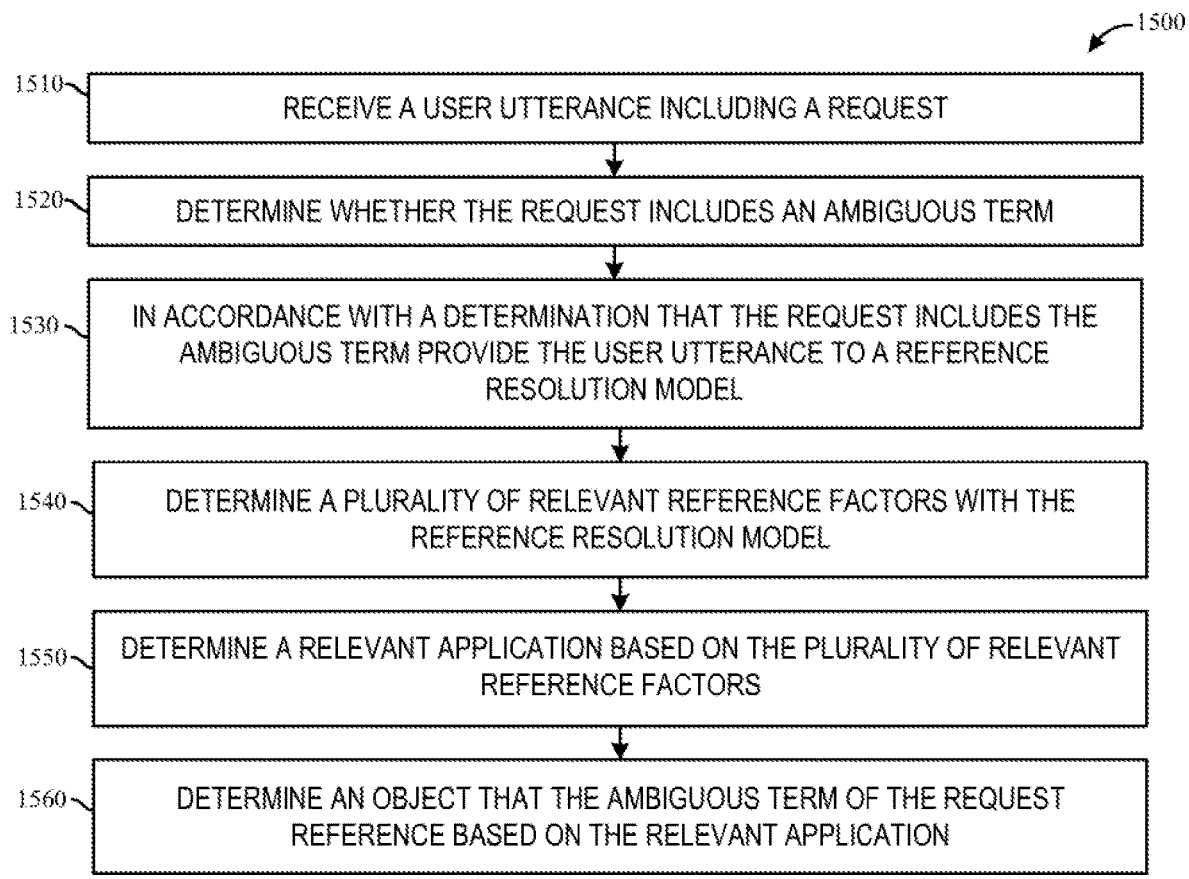
FIG. 15 is a flow diagram illustrating a process for resolving an ambiguous term of a user utterance.

FIG. 15 illustrates a process 1500 for resolving a reference of a user utterance, according to various examples. Process 1500 is performed at a device (e.g., device 100, 400, 500, 600) with one or more input devices (e.g., a touchscreen, a mic, a camera), and a wireless communication radio (e.g., a Bluetooth connection, WiFi connection, a mobile broadband connection such as a 4G LTE connection). In some embodiments, the electronic device includes a plurality of cameras. In some embodiments, the electronic device includes only one camera. In some examples, the device includes one or more biometric sensors which, optionally, include a camera, such as an infrared camera, a thermographic camera, or a combination thereof. Some operations in process 1500 are, optionally, combined, the orders of some operations are, optionally, changed, and some operations are, optionally, omitted.

In some examples, process 1500 is performed using a client-server system and the blocks of process 1500 are divided up in any manner between the server and a client device (e.g., device 100). In other examples, the blocks of process 1500 are divided up between the server and multiple client devices (e.g., a mobile phone and a smart watch). Thus, while portions of process 1500 are described herein as being performed by particular devices of a client-server system, it will be appreciated that process 1500 is not so limited. In other examples, process 1500 is performed using only a client device or only multiple client devices. In process 1500, some blocks are, optionally, combined, the order of some blocks is, optionally, changed, and some blocks are, optionally, omitted. In some examples, additional steps may be performed in combination with the process 1500.

At block 1510 a user utterance (e.g., user utterance 1205, 1304, 1404) including a request is received.

At block 1520 whether the request includes an ambiguous term is determined.

At block 1530, in accordance with a determination that the request includes the ambiguous term, the user utterance (e.g., user utterance 1205, 1304, 1404) is provided to a reference resolution model (e.g., reference resolution model 1210).

At block 1540, a plurality of relevant reference factors (e.g., plurality of relevant reference factors 1215) is determined with the reference resolution model (e.g., reference resolution model 1210). In some examples, the plurality of relevant reference factors includes a view (e.g., view 1301, 1401) of the electronic device (e.g., electronic device 100, 1300, 1400). In some examples, the plurality of relevant reference factors includes an ontology of an application installed on the electronic device. In some examples, the plurality of relevant reference factors includes a transcript of previously performed actions. In some examples, the plurality of relevant reference factors includes which applications are open on the electronic device. In some examples, the reference resolution model is a neural network trained to determine the object (e.g., object 1225, 1235, word 1302, picture 1303, virtual chair 1402, virtual table 1403) being referenced in the request.

In some examples, determining the plurality of relevant reference factors (e.g., plurality of relevant reference factors 1215) with the reference resolution model (e.g., reference resolution model 1210) further comprises selecting, based on the request and a context data of the electronic device (e.g., electronic device 100, 1300, 1400), the plurality of relevant reference factors from a plurality of reference factors.

In some examples, whether a view (e.g., view 1301, 1401) of the electronic device (e.g., electronic device 100, 1300, 1400) includes an object (e.g., object 1225, 1235, word 1302, picture 1303, virtual chair 1402, virtual table 1403) is determined. In accordance with a determination that the view of the electronic device includes the object, the object is included as a relevant reference factor (e.g., plurality of relevant reference factors 1215).

At block 1550, a relevant application is determined based on the plurality of relevant reference factors (e.g., plurality of relevant reference factors 1215). In some examples, determining the relevant application based on the relevant reference factors further comprises determining a natural language recognition score (e.g., natural language recognition score 906, 907) for the user utterance (e.g., user utterance 1205, 1304, 1404) with a natural language model (e.g., natural language model 1220, 1230) associated with a first application, determining whether the natural language recognition score exceeds a predetermined threshold and in accordance with a determination that the natural language recognition score exceeds the predetermined threshold, selecting the first application as the relevant application.

At block 1560, an object (e.g., object 1225, 1235, word 1302, picture 1303, virtual chair 1402, virtual table 1403) that the ambiguous term of the request references is determined based on the relevant application. In some examples, determining that the object that the ambiguous term of the request references based on the relevant application further comprises determining whether a portion of a natural language model (e.g., natural language model 1220, 1230) associated with the relevant application includes an object present in a view (e.g., view 1301, 1401) of the electronic device (e.g., electronic device 100, 1300, 1400). In some examples, determining that the object that the ambiguous term of the request references based on the relevant application further comprises determining whether an object of the natural language model associated with the relevant application includes a property related to a term of the user utterance (e.g., user utterance 1205, 1304, 1404).

In some examples, a user intent associated with the relevant application is received and a user intent score is determined based on the determined object and the received user intent.

In some examples, a second relevant application is determined based on the plurality of relevant reference factors (e.g., plurality of relevant reference factors 1215), a second object (e.g., object 1225, 1235, word 1302, picture 1303, virtual chair 1402, virtual table 1403) that the request references is determined based on the second relevant application, a second user intent associated with the second relevant application is received and a second user intent score is determined based on the second object and the second user intent.

In some examples, in accordance with a determination that the first user intent score is higher than the second user intent score, the first relevant application executes a first task associated with the first user intent on the first object (e.g., object 1225, 1235, word 1302, picture 1303, virtual chair 1402, virtual table 1403). In some examples, in accordance with a determination that the second user intent score is higher than the first user intent score, the second relevant application executes a second task associated with the second user intent on the second object (e.g., object 1225, 1235, word 1302, picture 1303, virtual chair 1402, virtual table 1403).

In some examples, whether the first task is not executed and in accordance with a determination that the first task is not executed an output indicating the first task was not executed including a prompt is provided. In some examples, an input responding to the prompt is received and the first relevant application executes the first task using the input received in response to the prompt. In some examples, in accordance with a determination that the first task is not executed the second relevant application executes a second task associated with the second user intent. In some examples, whether the second task is not executed is determined and in accordance with a determination that the second task is not executed, an output indicating an error is provided.

As described above, one aspect of the present technology is the using voice inputs to map commands to actions. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to quickly and efficiently determine how to respond to user commands. Accordingly, use of such personal information data enables users to calculated control of response resolution. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of enabling sensors, the present technology can be configured to allow users to select to "opt in" or "opt out" of participation in the collection of personal information data during registration for services or anytime thereafter. In another example, users can select to limit the length of time captured data and/or requests is maintained or entirely prohibit the development of saving the data or requests. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, sensors can be enabled by inferring preferences based on non-personal information data or a bare minimum amount of personal information, such as non-personal information available to the digital assistant, or publicly available information.

What is claimed is:

1. A first electronic device comprising:
one or more processors;
a memory; and
one or more programs, wherein the one or more programs are stored in the memory and configured to be executed by the one or more processors, the one or more programs including instructions for:
receiving an utterance from a user;
determining one or more representations of the utterance using a speech recognition model at least partially trained with data representing an application;
providing the one or more representations of the utterance to a plurality of natural language models, wherein a lightweight natural language model of the plurality of natural language models is associated with the application and a complex natural language model of the plurality of natural language models, wherein the complex natural language model is associated with the application and integrated with a digital assistant, and wherein the lightweight natural language model is registered when data representing the application is received from a second electronic device; and
determining a user intent of the utterance based on the at least one of the plurality of natural language models and a database including a plurality of actions and objects associated with the application.

2. The first electronic device of claim 1, wherein the data representing the application is derived from source code for the application.

3. The first electronic device of claim 2, wherein the source code for the application includes at least one of: models associated with the application, actions associated with the application, and objects associated with the application.

4. The first electronic device of claim 3, wherein the models associated with the application, the actions associated with the application, and the objects associated with the application are capable of being interacted with by a digital assistant.

5. The first electronic device of claim 1, wherein the at least one natural language model is previously trained at a second electronic device using training data determined based on the data representing the application and data representing the digital assistant.

6. The first electronic device of claim 5, wherein the training data includes application specific vocabulary, a translation of an application specific term, and an example text to be provided by the digital assistant as an output.

7. The first electronic device of claim 1, wherein registering the lightweight natural language model further comprises:
receiving a lightweight natural language model associated with the application; and
adding the application to a list of applications installed on the electronic device.

8. The first electronic device of claim 1, wherein integrating the complex natural language model further comprises:
receiving a complex natural language model associated with the application.

9. The first electronic device of claim 1, wherein providing the one or more representations of the utterance to a plurality of natural language models further comprises:
determining a natural language recognition score for the one or more representations of the utterance using the lightweight natural language model;
determining whether the natural language recognition score exceeds a predetermined threshold; and
in accordance with a determination that the natural language recognition score exceeds the predetermined threshold, receiving the complex natural language model associated with the application.

10. The first electronic device of claim 1, wherein the speech recognition model is trained with data representing the application and data representing the digital assistant.

11. The first electronic device of claim 1, the one or more programs further including instructions for:

training the speech recognition model to recognize application specific vocabulary.

12. The first electronic device of claim 1, wherein determining a user intent of the utterance based on the at least one of the plurality of natural language models and a database including a plurality of actions and objects associated with the application further comprises:
   determining an action of the database corresponding to the user intent; and
   determining an object of the database corresponding to the user intent.

13. The first electronic device of claim 1, the one or more programs further including instructions for:
   executing a task based on the action and the object.

14. The first electronic device of claim 1, wherein the lightweight natural language model and the complex natural language model are received from the second electronic device when the application is received from the second electronic device.

15. The first electronic device of claim 1, wherein the lightweight natural language model is a first lightweight natural language model, the complex natural language model is a first complex natural language model, and the application is a first application, and wherein a second lightweight natural language model of the plurality of natural language models is associated with a second application and a second complex natural language model of the plurality of natural language models, wherein the second complex natural language model is associated with the second application and integrated with the digital assistant, and wherein the second lightweight natural language model is registered when data representing the second application is received from a second electronic device.

16. A non-transitory computer-readable storage medium storing one or more programs configured to be executed by one or more processors of a first electronic device, the one or more programs including instructions for:
   receiving an utterance from a user;
   determining one or more representations of the utterance using a speech recognition model at least partially trained with data representing an application;
   providing the one or more representations of the utterance to a plurality of natural language models, wherein a lightweight natural language model of the plurality of natural language models is associated with the application and a complex natural language model of the plurality of natural language models, wherein the complex natural language model is associated with the application and integrated with a digital assistant, and wherein the lightweight natural language model is registered when data representing the application is received from a second electronic device; and
   determining a user intent of the utterance based on the at least one of the plurality of natural language models and a database including a plurality of actions and objects associated with the application.

17. The non-transitory computer-readable storage medium of claim 16, wherein the data representing the application is derived from source code for the application.

18. The non-transitory computer-readable storage medium of claim 17, wherein the source code for the application includes at least one of: models associated with the application, actions associated with the application, and objects associated with the application.

19. The non-transitory computer-readable storage medium of claim 18, wherein the models associated with the application, the actions associated with the application, and the objects associated with the application are capable of being interacted with by a digital assistant.

20. The non-transitory computer-readable storage medium of claim 16, wherein the at least one natural language model is previously trained at a second electronic device using training data determined based on the data representing the application and data representing the digital assistant.

21. The non-transitory computer-readable storage medium of claim 20, wherein the training data includes application specific vocabulary, a translation of an application specific term, and an example text to be provided by the digital assistant as an output.

22. The non-transitory computer-readable storage medium of claim 16, wherein registering the lightweight natural language model further comprises:
   receiving a lightweight natural language model associated with the application; and
   adding the application to a list of applications installed on the electronic device.

23. The non-transitory computer-readable storage medium of claim 16, wherein integrating the complex natural language model further comprises:
   receiving a complex natural language model associated with the application.

24. The non-transitory computer-readable storage medium of claim 16, wherein providing the one or more representations of the utterance to a plurality of natural language models further comprises:
   determining a natural language recognition score for the one or more representations of the utterance using the lightweight natural language model;
   determining whether the natural language recognition score exceeds a predetermined threshold; and
   in accordance with a determination that the natural language recognition score exceeds the predetermined threshold, receiving the complex natural language model associated with the application.

25. The non-transitory computer-readable storage medium of claim 16, wherein the speech recognition model is trained with data representing the application and data representing the digital assistant.

26. The non-transitory computer-readable storage medium of claim 16, the one or more programs further including instructions for:
   training the speech recognition model to recognize application specific vocabulary.

27. The non-transitory computer-readable storage medium of claim 16, wherein determining a user intent of the utterance based on the at least one of the plurality of natural language models and a database including a plurality of actions and objects associated with the application further comprises:
   determining an action of the database corresponding to the user intent; and
   determining an object of the database corresponding to the user intent.

28. The non-transitory computer-readable storage medium of claim 16, the one or more programs further including instructions for:
   executing a task based on the action and the object.

29. The non-transitory computer-readable storage medium of claim 16, wherein the lightweight natural language model and the complex natural language model are received from the second electronic device when the application is received from the second electronic device.

30. The non-transitory computer-readable storage medium of claim 16, wherein the lightweight natural language model is a first lightweight natural language model, the complex natural language model is a first complex natural language model, and the application is a first application, and wherein a second lightweight natural language model of the plurality of natural language models is associated with a second application and a second complex natural language model of the plurality of natural language models, wherein the second complex natural language model is associated with the second application and integrated with the digital assistant, and wherein the second lightweight natural language model is registered when data representing the second application is received from a second electronic device.

31. A method, comprising:
at a first electronic device with one or more processors and memory:
receiving an utterance from a user;
determining one or more representations of the utterance using a speech recognition model at least partially trained with data representing an application;
providing the one or more representations of the utterance to a plurality of natural language models, wherein a lightweight natural language model of the plurality of natural language models is associated with the application and a complex natural language model of the plurality of natural language models, wherein the complex natural language model is associated with the application and integrated with a digital assistant, and wherein the lightweight natural language model is registered when data representing the application is received from a second electronic device; and
determining a user intent of the utterance based on the at least one of the plurality of natural language models and a database including a plurality of actions and objects associated with the application.

32. The method of claim 31, wherein the data representing the application is derived from source code for the application.

33. The method of claim 32, wherein the source code for the application includes at least one of: models associated with the application, actions associated with the application, and objects associated with the application.

34. The method of claim 33, wherein the models associated with the application, the actions associated with the application, and the objects associated with the application are capable of being interacted with by a digital assistant.

35. The method of claim 31, wherein the at least one natural language model is previously trained at a second electronic device using training data determined based on the data representing the application and data representing the digital assistant.

36. The method of claim 35, wherein the training data includes application specific vocabulary, a translation of an application specific term, and an example text to be provided by the digital assistant as an output.

37. The method of claim 31, wherein registering the lightweight natural language model further comprises:
receiving a lightweight natural language model associated with the application; and
adding the application to a list of applications installed on the electronic device.

38. The method of claim 31, wherein integrating the complex natural language model further comprises:
receiving a complex natural language model associated with the application.

39. The method of claim 31, wherein providing the one or more representations of the utterance to a plurality of natural language models further comprises:
determining a natural language recognition score for the one or more representations of the utterance using the lightweight natural language model;
determining whether the natural language recognition score exceeds a predetermined threshold; and
in accordance with a determination that the natural language recognition score exceeds the predetermined threshold, receiving the complex natural language model associated with the application.

40. The method of claim 31, wherein the speech recognition model is trained with data representing the application and data representing the digital assistant.

41. The method of claim 31, further comprising:
training the speech recognition model to recognize application specific vocabulary.

42. The method of claim 31, wherein determining a user intent of the utterance based on the at least one of the plurality of natural language models and a database including a plurality of actions and objects associated with the application further comprises:
determining an action of the database corresponding to the user intent; and
determining an object of the database corresponding to the user intent.

43. The method of claim 31, further comprising:
executing a task based on the action and the object.

44. The method of claim 31, wherein the lightweight natural language model and the complex natural language model are received from the second electronic device when the application is received from the second electronic device.

45. The method of claim 31, wherein the lightweight natural language model is a first lightweight natural language model, the complex natural language model is a first complex natural language model, and the application is a first application, and wherein a second lightweight natural language model of the plurality of natural language models is associated with a second application and a second complex natural language model of the plurality of natural language models, wherein the second complex natural language model is associated with the second application and integrated with the digital assistant, and wherein the second lightweight natural language model is registered when data representing the second application is received from a second electronic device.

\* \* \* \* \*